(12) United States Patent
Ferguson et al.

(10) Patent No.: US 11,250,489 B2
(45) Date of Patent: Feb. 15, 2022

(54) FLEXIBLE COMPARTMENT DESIGN ON AUTONOMOUS AND SEMI-AUTONOMOUS VEHICLE

(71) Applicant: Nuro, Inc., Mountain View, CA (US)

(72) Inventors: David Ferguson, San Francisco, CA (US); Jiajun Zhu, Palo Alto, CA (US); Ben Julian, San Francisco, CA (US); Nan Ransohoff, San Francisco, CA (US)

(73) Assignee: NURO, INC., Mountain View, CA (US)

( * ) Notice: Subject to any disclaimer, the term of this patent is extended or adjusted under 35 U.S.C. 154(b) by 0 days.

(21) Appl. No.: 16/046,967

(22) Filed: Jul. 26, 2018

(65) Prior Publication Data

US 2019/0033883 A1    Jan. 31, 2019

Related U.S. Application Data

(60) Provisional application No. 62/538,538, filed on Jul. 28, 2017.

(51) Int. Cl.
  *G06Q 30/06* (2012.01)
  *G08G 1/04* (2006.01)
  (Continued)

(52) U.S. Cl.
  CPC ............ *G06Q 30/0631* (2013.01); *A23L 2/52* (2013.01); *A23L 5/00* (2016.08); *A23L 7/109* (2016.08);
  (Continued)

(58) Field of Classification Search
  CPC .. G05D 1/0291; G05D 1/0212; G05D 1/0088; G05D 1/0033; G05D 1/0094; G05D 1/0214; G05D 1/12; G05D 1/0276; G05D 1/0061; G05D 1/0231; G05D 2201/0207; G05D 2201/0213; G05D 1/0297; G05D 1/0295; H04W 4/024; H04W 4/40; G07F 17/12; G07F 17/0057; G08G 1/22; G07C 5/08; G07C 5/02; G07C 9/00896;
  (Continued)

(56) References Cited

U.S. PATENT DOCUMENTS 3,064,252 A   11/1962   Varela
4,766,548 A   8/1988    Cedrone et al.
(Continued)

FOREIGN PATENT DOCUMENTS

EP   2759990 A1   7/2014
GB   2544657 A    5/2017
(Continued)

OTHER PUBLICATIONS

American National Standard for Safe Use of Lasers. ANSI ZI136. 1-2000 (§4.5.1.5; 4.5.1.3-4 and p. 5) (19 pgs) (2000).
(Continued)

*Primary Examiner* — Aaron L Troost

(57) ABSTRACT

Provided herein is an autonomous or semi-autonomous vehicle fleet comprising a plurality of autonomous or semi-autonomous vehicles coordinated by a fleet management module. Each vehicle may be configured to receive a modular unit, wherein the modular unit is configured to secure a consumer product.

11 Claims, 21 Drawing Sheets

(51) Int. Cl.

| | |
|---|---|
| B60P 3/00 | (2006.01) |
| B60R 21/34 | (2011.01) |
| B65G 67/24 | (2006.01) |
| G01C 21/34 | (2006.01) |
| G05D 1/00 | (2006.01) |
| G05D 1/02 | (2020.01) |
| G05D 1/12 | (2006.01) |
| G06K 7/10 | (2006.01) |
| G06Q 10/06 | (2012.01) |
| G06Q 10/08 | (2012.01) |
| G06Q 50/12 | (2012.01) |
| G06Q 50/28 | (2012.01) |
| G08G 1/00 | (2006.01) |
| H04L 29/08 | (2006.01) |
| G06N 20/00 | (2019.01) |
| B60R 25/25 | (2013.01) |
| A23L 5/00 | (2016.01) |
| A23L 7/109 | (2016.01) |
| G06F 16/955 | (2019.01) |
| A23L 2/52 | (2006.01) |
| A47J 37/06 | (2006.01) |
| A47J 47/00 | (2006.01) |
| B60H 1/00 | (2006.01) |
| B60P 1/36 | (2006.01) |
| B60P 3/025 | (2006.01) |
| B60R 19/18 | (2006.01) |
| G06K 7/14 | (2006.01) |
| G06K 19/06 | (2006.01) |
| G06Q 20/00 | (2012.01) |
| G06Q 20/12 | (2012.01) |
| G06Q 20/18 | (2012.01) |
| G07F 17/00 | (2006.01) |
| G07F 17/12 | (2006.01) |
| G07C 5/02 | (2006.01) |
| G07C 5/08 | (2006.01) |
| G06K 9/00 | (2006.01) |
| G06Q 50/30 | (2012.01) |
| G06K 19/07 | (2006.01) |
| H04W 4/024 | (2018.01) |
| H04W 4/40 | (2018.01) |
| G06Q 30/02 | (2012.01) |
| G01C 21/20 | (2006.01) |
| B60R 19/48 | (2006.01) |
| G06F 3/0484 | (2013.01) |
| B60R 21/36 | (2011.01) |
| H04N 5/76 | (2006.01) |
| H05B 6/68 | (2006.01) |

(52) U.S. Cl.
CPC .......... *A47J 37/0658* (2013.01); *A47J 47/00* (2013.01); *B60H 1/00364* (2013.01); *B60H 1/00735* (2013.01); *B60P 1/36* (2013.01); *B60P 3/007* (2013.01); *B60P 3/0257* (2013.01); *B60R 19/18* (2013.01); *B60R 19/483* (2013.01); *B60R 21/34* (2013.01); *B60R 25/25* (2013.01); *B60R 25/252* (2013.01); *B65G 67/24* (2013.01); *G01C 21/20* (2013.01); *G01C 21/343* (2013.01); *G01C 21/3438* (2013.01); *G01C 21/3453* (2013.01); *G05D 1/0027* (2013.01); *G05D 1/0033* (2013.01); *G05D 1/0038* (2013.01); *G05D 1/0061* (2013.01); *G05D 1/0088* (2013.01); *G05D 1/0094* (2013.01); *G05D 1/0212* (2013.01); *G05D 1/0214* (2013.01); *G05D 1/0223* (2013.01); *G05D 1/0231* (2013.01); *G05D 1/0276* (2013.01); *G05D 1/0291* (2013.01); *G05D 1/12* (2013.01); *G06F 16/955* (2019.01); *G06K 7/10297* (2013.01); *G06K 7/10722* (2013.01); *G06K 7/1413* (2013.01); *G06K 9/00201* (2013.01); *G06K 9/00791* (2013.01); *G06K 19/06028* (2013.01); *G06K 19/0723* (2013.01); *G06N 20/00* (2019.01); *G06Q 10/0631* (2013.01); *G06Q 10/0635* (2013.01); *G06Q 10/06315* (2013.01); *G06Q 10/08* (2013.01); *G06Q 10/083* (2013.01); *G06Q 10/0832* (2013.01); *G06Q 10/0833* (2013.01); *G06Q 10/0834* (2013.01); *G06Q 10/0835* (2013.01); *G06Q 10/0837* (2013.01); *G06Q 10/08355* (2013.01); *G06Q 20/00* (2013.01); *G06Q 20/127* (2013.01); *G06Q 20/18* (2013.01); *G06Q 30/0266* (2013.01); *G06Q 30/0645* (2013.01); *G06Q 50/12* (2013.01); *G06Q 50/28* (2013.01); *G06Q 50/30* (2013.01); *G07C 5/02* (2013.01); *G07C 5/08* (2013.01); *G07F 17/0057* (2013.01); *G07F 17/12* (2013.01); *G08G 1/04* (2013.01); *G08G 1/202* (2013.01); *H04L 67/12* (2013.01); *H04W 4/024* (2018.02); *H04W 4/40* (2018.02); *A23V 2002/00* (2013.01); *B60R 21/36* (2013.01); *B60R 2021/346* (2013.01); *G05D 2201/0207* (2013.01); *G05D 2201/0213* (2013.01); *G06F 3/0484* (2013.01); *G08G 1/22* (2013.01); *H04N 5/76* (2013.01); *H05B 6/688* (2013.01)

(58) Field of Classification Search
CPC .. G07C 9/00563; G07C 9/00571; G07C 9/28; G07C 2009/0092; G07C 2209/63; A23L 5/00; A23L 7/109; A23L 2/52; A47J 37/0658; A47J 47/00; B60H 1/00364; B60H 1/00735; B60P 1/36; B60P 3/0257; B60R 19/18; B60R 25/252; B60R 25/25; B60R 21/36; B60R 2021/346; G06K 7/1413; G06K 19/06028; G06K 7/10722; G06K 9/00201; G06K 9/00791; G06K 7/10297; G06K 19/0723; G06Q 10/0635; G06Q 10/0832; G06Q 10/0833; G06Q 10/0834; G06Q 10/0835; G06Q 10/0837; G06Q 20/00; G06Q 20/127; G06Q 20/18; G06Q 30/0631; G06Q 30/0645; G06Q 10/083; G06Q 50/12; G06Q 50/28; G06Q 10/08355; G06Q 30/0266; G06Q 50/30; G06Q 10/00; G06Q 10/08; G06N 20/00; G01C 21/343; A23V 2002/00; H04N 5/76; H05B 6/688; G06F 16/955; G06F 3/0484; B64C 2201/128; B64C 2201/141

See application file for complete search history.

(56) References Cited

U.S. PATENT DOCUMENTS

| | | |
|---|---|---|
| 4,952,911 A | 8/1990 | D'Ambrosia et al. |
| 5,128,861 A | 7/1992 | Kagami et al. |
| 5,179,843 A | 1/1993 | Cohausz et al. |
| 5,207,784 A | 5/1993 | Schwartzendruber et al. |
| 5,636,122 A | 6/1997 | Shah et al. |
| 5,844,808 A | 12/1998 | Konsmo et al. |
| 5,877,688 A | 3/1999 | Morinaka et al. |
| D411,814 S | 7/1999 | Chibuka et al. |
| 5,922,040 A | 7/1999 | Prabhakaran et al. |
| 6,021,394 A | 2/2000 | Takahashi et al. |
| 6,034,803 A | 3/2000 | Sullivan et al. |
| 6,181,981 B1 | 1/2001 | Varga et al. |

(56) References Cited

U.S. PATENT DOCUMENTS

| | | |
|---|---|---|
| 6,230,150 B1 | 5/2001 | Walker et al. |
| 6,323,941 B1 | 11/2001 | Evans et al. |
| 6,571,150 B2 | 5/2003 | Arai et al. |
| 6,609,101 B1 | 8/2003 | Landvater et al. |
| 6,636,598 B1 | 10/2003 | Thomson et al. |
| 7,030,968 B2 | 4/2006 | D'Aligny et al. |
| 7,051,539 B2 | 5/2006 | Junge et al. |
| 7,139,721 B2 | 11/2006 | Borders et al. |
| 7,177,825 B1 | 2/2007 | Borders et al. |
| 7,190,465 B2 | 3/2007 | Froehlich et al. |
| 7,227,116 B2 | 6/2007 | Glecker et al. |
| 7,281,891 B2 | 10/2007 | Smith et al. |
| 7,521,935 B2 | 4/2009 | Uchida et al. |
| 7,534,984 B2 | 5/2009 | Gleckler |
| D615,905 S | 5/2010 | Arnell |
| 7,798,885 B2 | 9/2010 | Wong et al. |
| 7,798,886 B1 | 9/2010 | Williamson |
| 7,944,548 B2 | 5/2011 | Eaton |
| 8,072,581 B1 | 12/2011 | Breiholz |
| 8,191,779 B2 | 6/2012 | Illingworth et al. |
| 8,326,707 B2 | 12/2012 | Fan et al. |
| 8,630,897 B1 | 1/2014 | Prada et al. |
| 8,675,184 B2 | 3/2014 | Schmitt et al. |
| 8,788,341 B1 | 7/2014 | Patel et al. |
| 8,836,922 B1 | 9/2014 | Pennecot et al. |
| 8,862,388 B2 | 10/2014 | Wu et al. |
| 8,989,053 B1 | 3/2015 | Skaaksrud et al. |
| D734,211 S | 7/2015 | Ahn et al. |
| 9,086,273 B1 | 7/2015 | Gruver et al. |
| 9,147,192 B2 | 9/2015 | Dawson et al. |
| 9,230,236 B2 | 1/2016 | Villamar et al. |
| 9,256,852 B1 | 2/2016 | Myllymaki |
| 9,307,383 B1 | 4/2016 | Patrick et al. |
| D755,673 S | 5/2016 | Ahn et al. |
| 9,383,753 B1 | 7/2016 | Templeton et al. |
| 9,488,984 B1 | 11/2016 | Williams et al. |
| 9,489,490 B1 | 11/2016 | Theobald et al. |
| 9,552,564 B1 | 1/2017 | Martenis et al. |
| 9,613,346 B2 | 4/2017 | Crow et al. |
| 9,684,914 B1 | 6/2017 | Porter et al. |
| 9,741,010 B1 | 8/2017 | Heinla et al. |
| 9,786,187 B1 | 10/2017 | Bar-Zeev et al. |
| 9,815,633 B1 | 11/2017 | Kisser et al. |
| 9,824,394 B1 | 11/2017 | Boates et al. |
| 9,905,133 B1 | 2/2018 | Kumar et al. |
| 9,916,703 B2 | 3/2018 | Douillard et al. |
| 9,984,525 B2 | 5/2018 | Will et al. |
| 10,005,609 B1* | 6/2018 | Biene .................. B65D 81/389 |
| 10,029,787 B1 | 7/2018 | Lesser et al. |
| 10,120,384 B2 | 11/2018 | Wilkinson et al. |
| 10,414,344 B1* | 9/2019 | Northcott .................. B60P 3/03 |
| 2002/0023594 A1 | 2/2002 | Greene et al. |
| 2003/0209375 A1 | 11/2003 | Suzuki et al. |
| 2004/0181570 A1 | 9/2004 | Kaneko et al. |
| 2004/0225954 A1 | 11/2004 | Maloney |
| 2005/0043011 A1 | 2/2005 | Murray et al. |
| 2005/0060246 A1 | 3/2005 | Lastinger et al. |
| 2006/0106490 A1 | 5/2006 | Howell et al. |
| 2007/0182818 A1 | 8/2007 | Buehler et al. |
| 2007/0235465 A1 | 10/2007 | Walker et al. |
| 2010/0219953 A1 | 9/2010 | Bloy et al. |
| 2010/0228405 A1* | 9/2010 | Morgal .................. B62H 3/02 |
| | | 701/2 |
| 2010/0234991 A1 | 9/2010 | Zini et al. |
| 2010/0301056 A1 | 12/2010 | Wolfe et al. |
| 2011/0130134 A1 | 6/2011 | Van Rysselberghe et al. |
| 2011/0313811 A1 | 12/2011 | Urban et al. |
| 2012/0059729 A1 | 3/2012 | Roa et al. |
| 2012/0078553 A1 | 3/2012 | Kuroda et al. |
| 2012/0173747 A1 | 7/2012 | Roesch et al. |
| 2012/0185130 A1 | 7/2012 | Ekchian et al. |
| 2013/0061044 A1 | 3/2013 | Pinkus et al. |
| 2013/0282472 A1 | 10/2013 | Penilla et al. |
| 2013/0307698 A1 | 11/2013 | Park et al. |
| 2014/0021232 A1* | 1/2014 | Lazarevich .............. B60R 7/04 |
| | | 224/539 |
| 2014/0022051 A1 | 1/2014 | Levien et al. |
| 2014/0136414 A1 | 5/2014 | Abhyanker |
| 2014/0209634 A1 | 7/2014 | Metropulos et al. |
| 2014/0316561 A1 | 10/2014 | Tkachenko et al. |
| 2014/0330739 A1 | 11/2014 | Falcone et al. |
| 2014/0344608 A1 | 11/2014 | Wang et al. |
| 2014/0358353 A1 | 12/2014 | Ibanez-Guzman et al. |
| 2014/0370167 A1 | 12/2014 | Garden |
| 2014/0380264 A1 | 12/2014 | Misra et al. |
| 2015/0006005 A1 | 1/2015 | Yu et al. |
| 2015/0120094 A1 | 4/2015 | Kimchi et al. |
| 2015/0120602 A1* | 4/2015 | Huffman ................ G07F 17/12 |
| | | 705/339 |
| 2015/0134546 A1 | 5/2015 | Penilla et al. |
| 2015/0149015 A1 | 5/2015 | Nakano et al. |
| 2015/0154538 A1 | 6/2015 | Skaaksrud et al. |
| 2015/0170099 A1 | 6/2015 | Beach-Drummond et al. |
| 2015/0202770 A1 | 7/2015 | Patron et al. |
| 2015/0348112 A1 | 12/2015 | Ramanujam et al. |
| 2016/0018224 A1 | 1/2016 | Isler et al. |
| 2016/0033966 A1 | 2/2016 | Farris et al. |
| 2016/0062583 A1 | 3/2016 | Ricci |
| 2016/0071052 A1 | 3/2016 | Henry et al. |
| 2016/0098871 A1 | 4/2016 | Oz et al. |
| 2016/0247109 A1 | 8/2016 | Scicluna et al. |
| 2016/0286627 A1 | 9/2016 | Chen et al. |
| 2016/0300187 A1 | 10/2016 | Kashi et al. |
| 2016/0334797 A1 | 11/2016 | Ross et al. |
| 2016/0357187 A1 | 12/2016 | Ansari |
| 2016/0357188 A1 | 12/2016 | Ansari et al. |
| 2016/0358477 A1 | 12/2016 | Ansari et al. |
| 2016/0363991 A1 | 12/2016 | Schlecht et al. |
| 2017/0011580 A1 | 1/2017 | Huang et al. |
| 2017/0057516 A1 | 3/2017 | Gordon et al. |
| 2017/0075355 A1 | 3/2017 | Micks et al. |
| 2017/0090480 A1 | 3/2017 | Ho et al. |
| 2017/0115125 A1 | 4/2017 | Outwater et al. |
| 2017/0124547 A1* | 5/2017 | Natarajan .............. H04L 63/102 |
| 2017/0124781 A1 | 5/2017 | Douillard et al. |
| 2017/0132934 A1 | 5/2017 | Kentley et al. |
| 2017/0132960 A1 | 5/2017 | Kis-Benedek Pinero et al. |
| 2017/0153714 A1 | 6/2017 | Gao et al. |
| 2017/0193434 A1 | 7/2017 | Shah et al. |
| 2017/0215620 A1* | 8/2017 | Dade ..................... G07C 9/23 |
| 2017/0227962 A1 | 8/2017 | Cesarano et al. |
| 2017/0248964 A1 | 8/2017 | Kentley et al. |
| 2017/0255198 A1 | 9/2017 | Rodriguez et al. |
| 2017/0261977 A1 | 9/2017 | High et al. |
| 2017/0262790 A1 | 9/2017 | Khasis |
| 2017/0282859 A1 | 10/2017 | Grimm et al. |
| 2017/0313421 A1 | 11/2017 | Gil et al. |
| 2017/0323253 A1 | 11/2017 | Enssle et al. |
| 2018/0024554 A1 | 1/2018 | Brady et al. |
| 2018/0025635 A1 | 1/2018 | Cheaz et al. |
| 2018/0033308 A1 | 2/2018 | Litkouhi et al. |
| 2018/0053147 A1 | 2/2018 | Zhang et al. |
| 2018/0053369 A1 | 2/2018 | High et al. |
| 2018/0053423 A1 | 2/2018 | Dacosta et al. |
| 2018/0068253 A1 | 3/2018 | Simms et al. |
| 2018/0082343 A1 | 3/2018 | Gordon et al. |
| 2018/0099602 A1 | 4/2018 | Salter et al. |
| 2018/0101818 A1 | 4/2018 | Simms et al. |
| 2018/0134200 A1* | 5/2018 | Wilkinson .............. B60N 3/104 |
| 2018/0144300 A1* | 5/2018 | Wiechers ................ G06Q 50/28 |
| 2018/0157984 A1 | 6/2018 | O'Herlihy et al. |
| 2018/0158018 A1* | 6/2018 | Luckay .............. G06Q 10/0832 |
| 2018/0164828 A1* | 6/2018 | Dumitras ............... B25J 9/1676 |
| 2018/0165728 A1 | 6/2018 | Mcdonald et al. |
| 2018/0189716 A1 | 7/2018 | Crone et al. |
| 2018/0194411 A1 | 7/2018 | Liivik et al. |
| 2018/0196416 A1 | 7/2018 | Iagnemma et al. |
| 2018/0196417 A1 | 7/2018 | Iagnemma et al. |
| 2018/0211541 A1 | 7/2018 | Rakah et al. |
| 2018/0232839 A1 | 8/2018 | Heinla et al. |
| 2018/0246526 A1* | 8/2018 | Wilkinson ............ G05D 1/0291 |
| 2018/0253108 A1 | 9/2018 | Heinla et al. |
| 2018/0260778 A1 | 9/2018 | Mazetti et al. |

(56) References Cited

U.S. PATENT DOCUMENTS

| | | | |
|---|---|---|---|
| 2018/0260780 | A1 | 9/2018 | Mazetti et al. |
| 2018/0300676 | A1* | 10/2018 | Peterson .............. G05D 1/0246 |
| 2018/0330313 | A1 | 11/2018 | Clarke et al. |
| 2018/0349872 | A1 | 12/2018 | Ahmed et al. |
| 2018/0373246 | A1 | 12/2018 | Laughlin et al. |
| 2018/0374002 | A1 | 12/2018 | Li et al. |
| 2019/0023236 | A1 | 1/2019 | Webb et al. |

FOREIGN PATENT DOCUMENTS

| | | | |
|---|---|---|---|
| JP | H036407 | A | 1/1991 |
| JP | 2001256576 | A | 9/2001 |
| JP | 2006177843 | A | 7/2006 |
| WO | WO-2013025803 | A1 | 2/2013 |
| WO | 2015061008 | A1 | 4/2015 |
| WO | 2016164577 | A1 | 10/2016 |
| WO | WO-2017014544 | A1 | 1/2017 |
| WO | 2017064202 | A1 | 4/2017 |
| WO | WO-2017064202 | A1 | 4/2017 |
| WO | WO-2019018695 | A1 | 1/2019 |
| WO | WO-2019023518 | A1 | 1/2019 |
| WO | WO-2019023519 | A1 | 1/2019 |
| WO | WO-2019023521 | A1 | 1/2019 |
| WO | WO-2019023522 | A1 | 1/2019 |
| WO | WO-2019023615 | A1 | 1/2019 |
| WO | WO-2019023686 | A1 | 1/2019 |

OTHER PUBLICATIONS

AN/TPS-43 Radar System Westinghouse. Westinghouse (pp. 3, 4, 6, 9 & 14) (14 pgs) (2007).
Chen et al. 3d object proposals for accurate object class detection. In Advances in Neural Information Processing Systems, pp. 424-432 (2015).
Chen et al. Monocular 3d object detection for autonomous driving. In Proceedings of the IEEE Conference on Computer Vision and Pattern Recognition, pp. 2147-2156 (2016).
Chen et al. Multi-view 3d object detection network for autonomous driving. In IEEE CVPR, pp. 1907-1915 (2017).
Co-pending U.S. Appl. No. 16/040,418, filed Jul. 19, 2018.
Co-pending U.S. Appl. No. 16/040,432, filed Jul. 19, 2018.
Co-pending U.S. Appl. No. 16/040,437, filed Jul. 19, 2018.
Co-pending U.S. Appl. No. 16/040,446, filed Jul. 19, 2018.
Co-pending U.S. Appl. No. 16/046,954, filed Jul. 26, 2018.
Co-pending U.S. Appl. No. 16/046,978, filed Jul. 26, 2018.
Co-pending U.S. Appl. No. 16/046,980, filed Jul. 26, 2018.
Co-pending U.S. Appl. No. 16/047,901, filed Jul. 27, 2018.
Co-pending U.S. Appl. No. 16/048,124, filed Jul. 27, 2018.
Deng et al. Amodal detection of 3d objects: Inferring 3d bounding boxes from 2d ones in rgb-depth images. In Conference on Computer Vision and Pattern Recognition (CVPR), INSPEC Accession No. 17355643 (2017).
Engelcke et al. Vote3deep: Fast object detection in 3d point clouds using efficient convolutional neural networks. In Robotics and Automation (ICRA), 2017 IEEE International Conference on, pp. 1355-1361 (2017).
Food and Drugs Rule—Performance Standards for Light-Emitting Products 21 C.F.R. § 1040.10 (19 pgs) (2005).
FOX. vol. 6: Active Electro-Optical Systems. The Infrared & Electro-Optical Systems Handbook. (326 pgs) (1993).
Geiger et al. Vision meets robotics: The KITTI dataset. The International Journal of Robotics Research 32(11):1231-1237 (2013).
Girshick et al. Rich feature hierarchies for accurate object detection and semantic segmentation. In Computer Vision and Pattern Recognition (CVPR) 2014 IEEE Conference on, pp. 580-587 (2014).
Gustavson. Diode-laser radar for low cost weapon guidance. SPIE 1633(VII):21-32 (pp. 21, 27, 28, 31 & Fig. 3.3-1) (1992).
Kawata et al. Development of ultra-small lightweight optical range sensor systems. 2005 IEEE/RSJ International Conference on Intelligent Robots and Systems. INSPEC Accession No. 8750287. (6 pgs) (Aug. 2-6, 2005).
Kilpela. Precise pulsed time-of-flight laser range finder for industrial distance measurements. Review of Scientific Instruments 72:2197 (Apr. 2001).
Lahoud et al. 2d-driven 3d object detection in rgb-d images. In Proceedings of the IEEE Conference on Computer Vision and Pattern Recognition, pp. 4622-4630 (2017).
Liu et al. SSD: Single shot multibox detector. In European conference on computer vision, pp. 21-37. Springer (2016).
Maturana et al. Voxnet: A 3d convolutional neural network for real-time object recognition. In IEEE/RSJ International Conference on Intelligent Robots and Systems (7 pgs) (Sep. 2015).
Mousavian et al. 3d bounding box estimation using deep learning and geometry. In Computer Vision and Pattern Recognition (CVPR), pp. 7074-7082 (2016).
Qi et al. Pointnet++: Deep hierarchical feature learning on point sets in a metric space. NIPS (14 pgs) (2017).
Qi et al. Frustum PointNets for 3D Object Detection from RGB-D Data. In Computer Vision and Pattern Recognition (CVPR), pp. 918-927 (Apr. 2018).
Qi et al. Pointnet: Deep learning on point sets for 3d classification and segmentation. Proc. Computer Vision and Pattern Recognition (CVPR), pp. 652-660 (2017).
Qi et al. Volumetric and multi-view cnns for object classification on 3d data. In Proceedings Computer Vision and Pattern Recognition (CVPR), pp. 5648-5656 (2016).
Ren et al. Accurate single stage detector using recurrent rolling convolution. In Computer Vision and Pattern Recognition (CVPR), pp. 5420-5428 (2017).
Ren et al. Faster r-cnn: Towards real-time object detection with region proposal networks. In Advances in neural information processing systems, pp. 91-99 (2015).
Ren et al. Three-dimensional object detection and layout prediction using clouds of oriented gradients. In Proceedings of the IEEE Conference on Computer Vision and Pattern Recognition, pp. 1525-1533 (2016).
Richmond et al. Polarimetric Imaging Laser Radar (PILAR) Program. In Advanced Sensory Payloads forUAV. Meeting Proceedings RTO-MP-SET-092, Paper 19. Neuilly-sur-Sein, France: RTO (35 pgs) (May 1, 2005).
Riegler et al. Octnet: Learning deep 3d representations at high resolutions. In Computer Vision and Pattern Recognition (CVPR), pp. 3577-3586 (2016).
Skolnik. Introduction to Radar Systems Handbook. McGraw-Hill Book Company. (590 pgs)(2d ed. 1980).
Skolnik. Radar Handbook. McGraw-Hill Book Company (1.18, 20.6 & 20.7-8) (846 pgs)(2d ed. 1990).
Song et al. Deep sliding shapes for amodal 3d object detection in rgb-d images. In Proceedings of the IEEE Conference on Computer Vision and Pattern Recognition, pp. 808-816 (2016).
Song et al. Sliding shapes for 3d object detection in depth images. In Computer Vision—ECCV 2014, pp. 634-651 (2014).
Song et al. Sun rgb-d: A rgb-d scene understanding benchmark suite. In Proceedings of the IEEE Conference on Computer Vision and Pattern Recognition, pp. 567-576 (2015).
Su et al. Multi-view convolutional neural networks for 3d shape recognition. In Proceedings of the IEEE Conference on Computer Vision and Pattern Recognition, pp. 945-953 (2015).
Wang et al. O-cnn: Octree-based convolutional neural networks for 3d shape analysis. ACM Transactions on Graphics (TOG) 36(4):72 (2017).
Wu et al. 3d shapenets: A deep representation for volumetric shapes. In Proceedings of the IEEE Conference on Computer Vision and Pattern Recognition, pp. 1912-1920 (2015).
Xiang et al. Data-driven 3d voxel patterns for object category recognition. In Proceedings of the IEEE Conference on Computer Vision and Pattern Recognition, pp. 1903-1911 (2015).
Yu et al. Vehicle detection and localization on birds eye view elevation images using convolutional neural network. 2017 IEEE International Symposium on Safety, Security and Res-cue Robotics (SSRR) INSPEC Accession No. 17315970 (2017).
Qi et al. Frustum PointNets for 3D Object Detection from RGB-D Data. Available from https://arxiv.org/pdf/1711.08488v1.pdf (15 pgs.) (Nov. 2017).

(56) References Cited

OTHER PUBLICATIONS

PCT/US2018/042967 International Search Report and Written Opinion dated Sep. 26, 2018.
PCT/US2018/043987 International Search Report and Written Opinion dated Oct. 2, 2018.
PCT/US2018/043989 International Search Report and Written Opinion dated Oct. 5, 2018.
PCT/US2018/043990 International Search Report and Written Opinion dated Oct. 5, 2018.
U.S. Appl. No. 16/040,446 Office Action dated Oct. 17, 2018.
Co-pending U.S. Appl. No. 16/119,939, filed Aug. 31, 2018.
PCT/US2018/043986 International Search Report and Written Opinion dated Oct. 23, 2018.
PCT/US2018/044155 International Search Report and Written Opinion dated Oct. 15, 2018.
PCT/US2018/044248 International Search Report and Written Opinion dated Oct. 24, 2018.
U.S. Appl. No. 16/048,124 Office Action dated Nov. 1, 2018.
Curtis et al., Skype founders invent self-driving robot that can deliver groceries for L1. London Telegraph (3 pgs) (2015).
Emerging Tech. Domino's has built a self-driving pizza delivery robot. Available at https://www.digitaltrends.com/cool-tech/dominos-pizza-delivery-robot/ (12 pgs) (2016).
Navarro et al. A mobile robot vending machine for beaches based on customer's preferences and multivariate methods. Procedia—Social and Behavioral Sciences 175:122-129 (2015).
Olson . Self-Driving Robots Will Start Delivering Food For Just Eat And Others. Available at https://www.forbes.com/sites/parmyolson/2016/07/05/self-driving-robots-food-delivery-just-eat/#6e3e834b280d (3 pgs) (2016).
Peters. The Grocery Store, of the Future is Mobile, Self-Driving and Run by AI. Fast Company (6 pgs.) (Jun. 13, 2017).
PETTITT. Forget delivery drones, meet your new delivery robot. Available at https://www.cnbc.com/2015/11/02/forget-delivery-drones-meet-your-new-delivery-robot.html (5 pgs) (2015).
Ratkov. Robotic Vending Machines Anthonyratkkov.com/robotics/roboticvending machines (2 pgs.) (2010).
U.S. Appl. No. 16/046,954 Office Action dated Nov. 29, 2018.
U.S. Appl. No. 16/046,967 Office Action dated Dec. 4, 2018.
U.S. Appl. No. 16/046,978 Office Action dated Feb. 28, 2019.
U.S. Appl. No. 16/046,980 Office Action dated Feb. 27, 2019.
U.S. Appl. No. 16/047,901 Office Action dated Dec. 11, 2018.
Westaway. Meet the robot built to deliver your shopping. Starship Technologies' "local delivery robot" is semi-autonomous, covered in cameras and ready to bring food to your door. Available at https://www.cnet.com/news/meet-the-robot-thats-built-to-deliver-your-shopping/ (4 pgs.) (2016).

\* cited by examiner

FLEXIBLE COMPARTMENT DESIGN ON AUTONOMOUS AND SEMI-AUTONOMOUS VEHICLE

CROSS REFERENCE

This application claims priority to U.S. Provisional Application No. 62/538,538, filed on Jul. 28, 2017, the contents of which are incorporated herein by reference in its entirety.

BACKGROUND OF THE INVENTION

The field of autonomous and semi-autonomous vehicles is a growing field of innovation. Vehicles are being used for many purposes including warehouse inventory operations, household operations, hospital deliveries, sanitation, and military or defense applications.

SUMMARY OF THE INVENTION

This disclosure relates to an autonomous or semi-autonomous vehicle fleet comprising a plurality of vehicles, in particular vehicles for transporting or retrieving deliveries in either unstructured outdoor environment or closed environments.

Current manned delivery systems, platforms, and methods are expensive and inefficient, mainly due to the need for human drivers. Further, many current manned delivery means are configured for delivery and preservation of a single product. Although many additional restaurants and vendors seek to provide delivery service for their customers, specialized and dedicated delivery services to sufficiently maintain the quality of a food or beverage item, is cost prohibitive. Further, without a dedicated delivery vehicle for each restaurant, current manned delivery vehicles are unable to stock additional items for on-delivery supplemental orders. Additionally, current manned delivery systems are often configured to securely hold and transport one specific item, or to hold and transport a variety of items in an unsecure fashion.

One aspect provided herein is an autonomous or semi-autonomous land vehicle configured to receive a modular unit, the vehicle comprising: an energy storage device; a communication device; an autonomous or semi-autonomous land propulsion system; a vehicle interior fastener configured to reversibly affix the modular unit to the vehicle; a non-transitory computer-readable storage media encoded with a computer program including instructions executable by a processor to create an application comprising: a navigation module receiving at least a location via the communication device and directing the autonomous or semi-autonomous land propulsion system based at least on the location; and a transmission module transmitting an output data, receiving an input data, or both, via the communication device, to a command center; and at least one of: a vehicle power port configured to transmit power from the energy storage device to the modular unit; a vehicle data port communicatively connecting the modular unit and the transmission module; a vehicle temperature control system, a cooling port, and a heating port configured to heat the modular unit, cool the modular unit, or both; and a vehicle exhaust port configured to receive an exhaust from the modular unit.

In some embodiments, the communication device comprises a Wi-Fi communication device, a Bluetooth communication device, a cellular communication device, a satellite communication device, or any combination thereof. In some embodiments, the vehicle data port comprises a wired data interface, a Wi-Fi communication device, a Bluetooth communication device, a cellular communication device, or any combination thereof. In some embodiments, the vehicle interior fastener comprises a hook, a ring, a shelf, a bar, a spring, a rail, a slide, a bolt, a nut, a bearing, a bushing, a tie, a clip, a chain, a rack, a magnet, or any combination thereof. In some embodiments, the vehicle further comprises a plurality of vehicle interior fasteners, the plurality of vehicle interior fasteners comprising a first vehicle interior fastener configured to reversibly affix a first type of modular unit and a second vehicle interior fastener configured to reversibly affix a second type of modular unit. In some embodiments, the vehicle interior fastener comprises at least one of the vehicle power port, the vehicle data port, the vehicle cooling/heating port, and the vehicle exhaust port. In some embodiments, the vehicle further comprises a lock configured to prevent unauthorized removal of the modular unit from the vehicle. In some embodiments, the vehicle interior fastener comprises the lock. In some embodiments, the vehicle is configured to receive two or more modular units. In some embodiments, the vehicle is configured to receive 3 to 25 modular units. In some embodiments, the modular unit is configured to secure a consumer product. In some embodiments, the consumer product comprises a food item, a beverage item, an electronics item, a clothing item, or any combination thereof. In some embodiments, the vehicle data port receives data from at least one sensor configured to measure a sensed data corresponding to the modular unit. In some embodiments, the input data comprises a modular unit temperature target, a modular unit display data, a modular unit indicator data, a modular unit access data, or any combination thereof. In some embodiments, the output data comprises a presence of a consumer product secured by the modular unit, a modular unit access status, a current modular unit temperature, a modular unit stock, a modular unit type, or any combination thereof. In some embodiments, the vehicle comprises an interior compartment, and wherein the vehicle interior fastener is configured to reversibly affix the modular unit within the interior compartment. In some embodiments, the vehicle further comprises a permanently fixed modular unit.

Another aspect provided herein is a modular unit configured to be removably disposed within an autonomous or semi-autonomous land vehicle comprising: a modular unit fastener configured to reversibly attach to the vehicle; and at least one of: a modular unit power port configured to receive power from the vehicle; a modular unit data port configured to receive an input data from the vehicle, transmit an output data to the vehicle, or both; a modular unit cooling/heating port configured to receive heat from the vehicle, receive cooling from the vehicle, or both; and a modular unit exhaust port configured to emit an exhaust to the vehicle.

In some embodiments, the modular unit fastener comprises a hook, a ring, a shelf, a bar, a spring, a rail, a slide, a bolt, a nut, a bearing, a bushing, a tie, a clip, a chain, a rack, a magnet, or any combination thereof. In some embodiments, the modular unit fastener comprises at least one of the modular unit power port, the modular unit data port, the modular unit cooling/heating port, and the modular unit exhaust port. In some embodiments, the modular unit power port comprises a jack, an outlet, a cord, a cable, a wireless power transfer unit, or any combination thereof. In some embodiments, the modular unit data port comprises a jack, an outlet, a cord, a cable, a wired data interface, a Wi-Fi communication device, a Bluetooth communication device, a cellular communication device, or any combination thereof.

Another aspect provided herein is a reconfigurable autonomous or semi-autonomous vehicle system comprising: a modular unit comprising a modular unit fastener and at least one of: a modular unit power port; a modular unit data port; a modular unit cooling/heating port; and a modular unit exhaust port; and an autonomous or semi-autonomous land vehicle comprising: an energy storage device; a communication device; an autonomous or semi-autonomous propulsion system; a vehicle interior fastener configured to reversibly affix the modular unit to the vehicle; a non-transitory computer-readable storage media encoded with a computer program including instructions executable by a processor to create an application comprising: a navigation module receiving at least a location via the communication device and directing the autonomous or semi-autonomous land propulsion system based at least on the location; and a transmission module transmitting an output data, receiving an input data, or both, via the communication device, to a command center; and at least one of: a vehicle power port configured to transmit power to the modular unit power port; a vehicle data port communicatively connected to the modular unit data port; a vehicle temperature control system, a cooling port, and a heating port configured to heat the modular unit, cool the modular unit, or both, via the modular unit cooling/heating port; and a vehicle exhaust port configured to receive an exhaust from the modular unit exhaust port.

In some embodiments, the communication device comprises a Wi-Fi communication device, a Bluetooth communication device, a cellular communication device, a satellite communication device, or any combination thereof. In some embodiments, the vehicle data port comprises a wired data interface, a Wi-Fi communication device, a Bluetooth communication device, a cellular communication device, or any combination thereof. In some embodiments, the vehicle interior fastener comprises a hook, a ring, a shelf, a bar, a spring, a rail, a slide, a bolt, a nut, a bearing, a bushing, a tie, a clip, a chain, a rack, a magnet, or any combination thereof. In some embodiments, the vehicle further comprises a plurality of vehicle interior fasteners, the plurality of vehicle interior fasteners comprising a first vehicle interior fastener configured to reversibly affix a first type of modular unit and a second vehicle interior fastener configured to reversibly affix a second type of modular unit. In some embodiments, the vehicle interior fastener comprises at least one of the vehicle power port, the vehicle data port, the vehicle cooling/heating port, and the vehicle exhaust port. In some embodiments, the vehicle further comprises a lock configured to prevent unauthorized removal of the modular unit from the vehicle. In some embodiments, the vehicle interior fastener comprises the lock. In some embodiments, the vehicle is configured to receive two or more modular units. In some embodiments, the vehicle is configured to receive 3 to 25 modular units. In some embodiments, the modular unit is configured to secure a consumer product. In some embodiments, the consumer product comprises a food item, a beverage item, an electronics item, a clothing item, or any combination thereof. In some embodiments, the vehicle data port receives data from at least one sensor configured to measure a sensed data corresponding to the modular unit. In some embodiments, the input data comprises a modular unit temperature target, a modular unit display data, a modular unit indicator data, a modular unit access data, or any combination thereof. In some embodiments, the output data comprises a presence of a consumer product secured by the modular unit, a modular unit access status, a current modular unit temperature, a modular unit stock, a modular unit type, or any combination thereof. In some embodiments, the vehicle comprises an interior compartment, and wherein the vehicle interior fastener is configured to reversibly affix the modular unit within the interior compartment. In some embodiments, the vehicle further comprises a permanently fixed modular unit. In some embodiments, the modular unit fastener comprises a hook, a ring, a shelf, a bar, a spring, a rail, a slide, a bolt, a nut, a bearing, a bushing, a tie, a clip, a chain, a rack, a magnet, or any combination thereof. In some embodiments, the modular unit fastener comprises at least one of the modular unit power port, the modular unit data port, the modular unit cooling/heating port, and the modular unit exhaust port. In some embodiments, the modular unit power port comprises a jack, an outlet, a cord, a cable, a wireless power transfer unit, or any combination thereof. In some embodiments, the modular unit data port comprises a jack, an outlet, a cord, a cable, a wired data interface, a Wi-Fi communication device, a Bluetooth communication device, a cellular communication device, or any combination thereof.

Another aspect provided herein is a vehicle fleet comprising a plurality of autonomous vehicles operating autonomously and/or semi-autonomously and a fleet management module, associated with a central server for coordination of the vehicle fleet; the fleet management module configured to coordinate the activity and positioning of each autonomous vehicle in the fleet, wherein the fleet is configured for transporting, delivering or retrieving goods or services and capable of operating in an unstructured open or closed environments; each autonomous vehicle in the fleet comprising: a power system, a conveyance system; (e.g., a drive system with a propulsion engine, wheels, treads, wings, rotors, blowers, rockets, propellers, brakes, etc.); a navigation module for navigation in the unstructured open or closed environments; (e.g., digital maps, HD maps, GPS); a communication module configurable to receive, store and send data to the fleet management module, a user, and the autonomous vehicles in the fleet, related to at least; user interactions and the vehicle fleet interactions, comprising: scheduled requests or orders, on-demand requests or orders, or a need for self-positioning of the vehicle fleet based on anticipated demand within the unstructured open or closed environments; a sensor system, at least one securable compartment or a plurality of securable compartments to hold said goods or items associated with said services; and a controller configurable to associate each one of the at least one or plurality of securable compartments to an assignable customer, or customer group in a marketplace, or provider and provide entry when authorized; at least one processor configured to manage the conveyance system, the navigation module, the sensor system, instructions from the fleet management module, the communication module, and the controller.

In some embodiments, the unstructured open environment is a non-confined geographic region accessible by navigable pathways comprising: public roads; private roads; bike paths; open fields; open public lands; open private lands; pedestrian walkways; lakes; rivers; streams; or open airspace. In some embodiments, each vehicle fleet is configured with a maximum speed range from 1.0 mph to 90.0 mph.

In some embodiments, the closed environment is a confined, enclosed or semi-enclosed structure accessible by navigable pathways comprising: open areas or rooms within commercial architecture, with or without structures or obstacles therein; airspace within open areas or rooms within commercial architecture, with or without structures or obstacles therein; public or dedicated aisles; hallways; tunnels; ramps; elevators; conveyors; or pedestrian walkways.

In some embodiments, the navigation module controls routing of the conveyance system of the autonomous vehicles in the fleet in the unstructured open or closed environments. In some embodiments, the communication to the user, to the autonomous vehicles in the fleet, between the autonomous vehicles of the fleet, and between the user and the autonomous vehicles in the fleet, occurs via wireless transmission. In some embodiments, the user comprises a fleet manager; a sub-contracting vendor; a service provider; a customer; a business entity; an individual; or a third party.

In some embodiments, the user's wireless transmission interactions and the vehicle fleet wireless transmission interactions occur via mobile application transmitted by an electronic device and forwarded to the communication module via: a central server; a fleet management module; and/or a mesh network.

In some embodiments, the electronic device comprises: a phone; a personal mobile device; a personal digital assistant (PDA); a mainframe computer; a desktop computer; a laptop computer; a tablet computer; and/or wearable computing device comprising: a communication headset; smart glasses; a contact lens or lenses; a digital watch; a bracelet; a ring; jewelry; or a combination thereof.

In some embodiments, the plurality of securable compartments is configurable for a plurality of goods. Such configurations and goods comprise: bookshelves for books; thin drawers for documents; larger box-like drawers for packages, and sized compartments for vending machines, coffee makers, pizza ovens and dispensers. In some embodiments, the plurality of securable compartments is variably configurable based on: anticipated demands; patterns of behaviors; area of service; or types of goods to be transported. In some embodiments, the plurality of securable compartments is humidity and temperature controlled for: hot goods, cold goods, wet goods, dry goods, or combinations or variants thereof. In some embodiments, the services comprise: subscription services; prescription services; marketing services; advertising services; notification services; a mobile marketplace; or requested, ordered or scheduled delivery services. In particular embodiments, the scheduled delivery services include, by way of example, special repeat deliveries such as groceries, prescriptions, drinks, mail, documents, etc. In some embodiments, the services further comprise: the user receiving and returning the same or similar goods within the same interaction; (e.g., signed documents); the user receiving one set of goods and returning a different set of goods within the same interaction; (e.g., product replacement/returns, groceries, merchandise, books, recording, videos, movies, payment transactions, etc.); a third party user providing instruction and or authorization to a goods or service provider to prepare, transport, deliver and/or retrieve goods to a principle user in a different location. In some embodiments, the services further comprise: general services, (e.g., picking up a user's dry cleaning, dropping off a user's dry cleaning, renting goods, (such as tools, DVDs, etc.), sharing/borrowing goods from other users or businesses, etc.). Further still, it may be a general pickup service for items to be shipped, returned, or sent to other users/businesses, etc.

In some embodiments, at least one autonomous vehicle in the fleet is further configured to process or manufacture goods. In some embodiments, the processed or manufactured goods comprise: beverages, etc., with or without condiments; (e.g., coffee, tea, carbonated drinks, etc.); a plurality of fast foods; or microwavable foods.

In some embodiments, the vehicle fleet further comprises at least one autonomous vehicle having a digital display for curated content comprising: advertisements (i.e., for both specific user and general public), including; services provided, marketing/promotion, regional/location of areas served, customer details, local environment, lost, sought or detected people, public service announcements, date, time, or weather.

In some embodiments of the vehicle fleet, the positioning of autonomous vehicles may be customized based on: anticipated use, a pattern of historical behaviors, or specific goods being carried. In some embodiments, the vehicle fleet is fully-autonomous. In some embodiments, the vehicle fleet is semi-autonomous. In some embodiments, the vehicle fleet is controlled directly by the user. In some embodiments of the vehicle fleet, a plurality of said autonomous or semi-autonomous vehicles within the fleet is operated on behalf of third party vendor/service provider; (e.g., fleet managed by an owner, but providing a coffee service/experience for a third party vendor (i.e., Starbucks) with white label vehicles in the fleet). In some embodiments of the vehicle fleet, a plurality of said autonomous vehicles within the fleet is further configured to be part of a sub-fleet comprising a sub-plurality of autonomous vehicles, wherein each sub-fleet is configured to operate independently or in tandem with multiple sub-fleets comprising two or more sub-fleets.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

This disclosure relates to an autonomous or semi-autonomous vehicle fleet comprising a plurality of autonomous vehicles, for transporting or retrieving deliveries in either open unstructured outdoor environments or closed environments.

Provided herein is an autonomous or semi-autonomous land vehicle configured to receive a modular unit.

Currently, dedicated custom-made manned vehicles are used for specific use cases. Manned vehicles with cooling systems have been used to deliver fresh cool produce. Such dedicated custom vehicles, however, are unable to simultaneously deliver different items. Alternatively, delivery services that use generic unmodified vehicles are able to simultaneously deliver a wide array of items, but are not configured for optimal delivery of temperature or motion sensitive items.

By contrast, the reconfigurable autonomous vehicle herein may be easily modified to carry different types of removable display cases to enable optimal transport and delivery of various items. The reconfigurable autonomous vehicle herein may be configured to provide optimal delivery of various items without interaction or maintenance by a human driver. Further, the reconfigurable autonomous vehicle may be employed for longer operating hours per day than human drivers, whereby facile reconfigurability ensures optimal utilization throughout the day and/or night.

Fleet of Autonomous Vehicles

Figure 1:
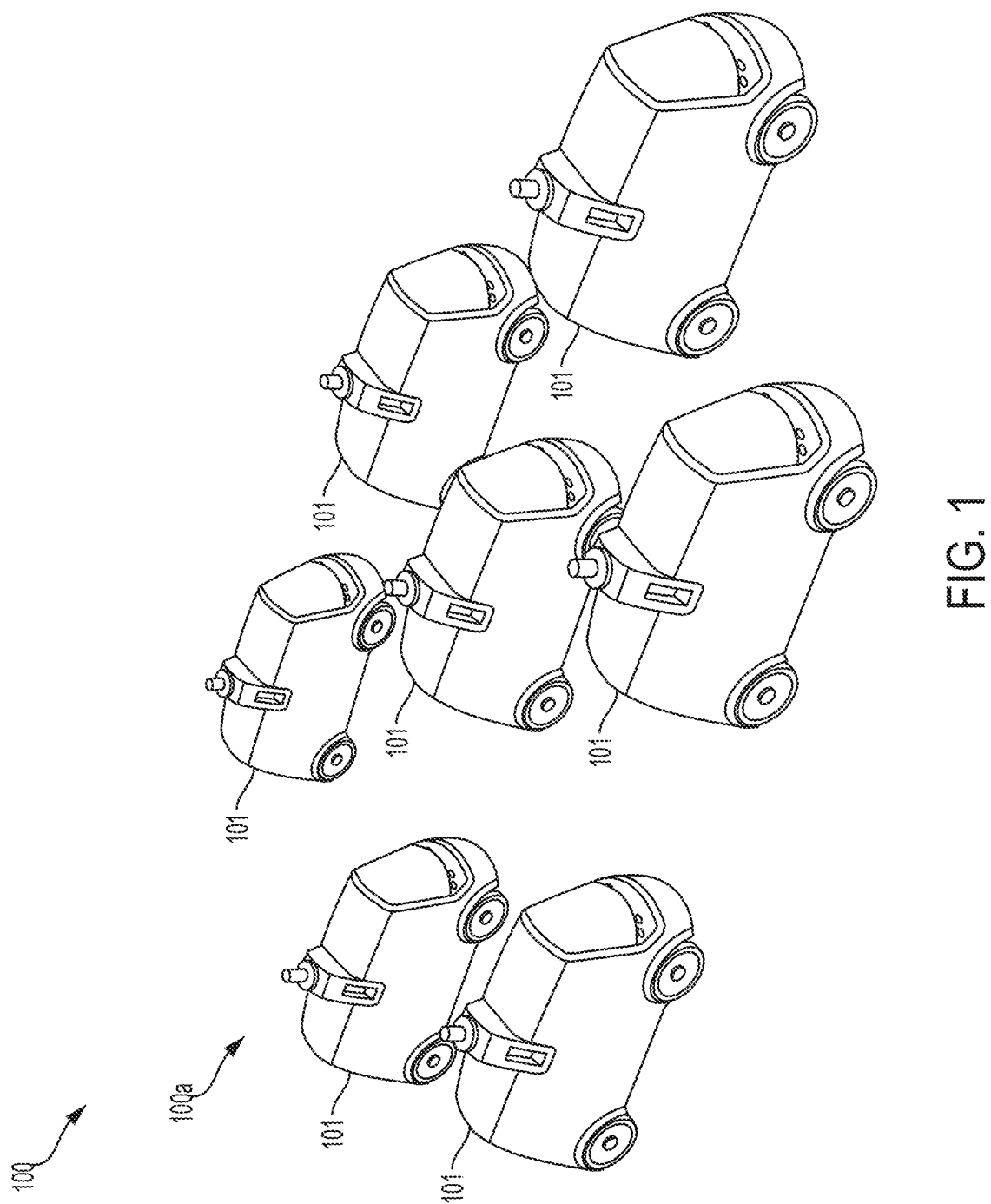
FIG. 1 is an illustration of an exemplary vehicle fleet, in accordance with some embodiments.

Provided herein, per FIG. 1, is a vehicle fleet 100, comprising a plurality of autonomous or semi-autonomous vehicles 101.

In some embodiments, one or more of the vehicles 101 in the vehicle fleet 100 are autonomous. In some embodiments, one or more of the vehicles 101 in the vehicle fleet 100 are autonomous. In some embodiments the semi-autonomous vehicles 101 can be manually controller by an operator. Manual override may be required to, for example, address navigation malfunctions, provider inventory issues, or unanticipated traffic, mechanical failure, electrical failure, traffic accident, and road conditions. In some embodiments of the plurality of autonomous vehicles 101 within the fleet 100 is operated on behalf of third party vendor or service provider. The third party vendor or service provider may comprise a food and beverage provider.

In some embodiments, one or more of the vehicles 101 within the vehicle fleet 100 are configured to be part of a sub-fleet 100*a* that operates independently or in tandem with other sub-fleets 100*a*. In one example, the sub-fleet 100*a* of vehicles 101 may only provide a product, service, or level of service associated with a single vendor. Each of the vehicles 101 in the sub-fleet 100*a* may display a logo of the vendor or an alternative indicator representing the specific product, service, or level of service associated with that vehicle 101. Levels of service may include immediate dedicated rush service, guaranteed morning/afternoon delivery service, and general delivery service. Some sub-fleets 100*a* may offer a faster or more prioritized service than other sub-fleets 100*a*.

Autonomous and Semi-Autonomous Vehicles

As illustrated in FIGS. 1-11, the vehicle 101 may comprise an autonomous or semi-autonomous automobile configured for land travel. The vehicle 101 may have a width, a height, and a length, wherein the length is about 2 feet to about 5 feet. The vehicle 101 may be lightweight and have a low center of gravity for increased stability. The vehicle 101 may be configurable for land, water, or air. The vehicle 101 may comprise a land vehicle such as, for example, a car, a wagon, a van, a tricycle, a truck, a trailer, a bus, a train, or a tram. The vehicle 101 may comprise a watercraft such as, for example, a ship, a boat, a ferry, a landing craft, a barge, a rafts, a hovercraft, or any combination thereof. Alternatively, the vehicle 101 may comprise an aircraft or a spacecraft.

Each vehicle 101 in the fleet may comprise an autonomous propulsion system 130 comprising a drive system, a propulsion engine, a wheel, a treads, a wing, a rotor, a blower, a rocket, a propeller, a brake, or any combination thereof.

In one exemplary embodiment, a vehicle 101 comprises a land vehicle configured with a traditional 4-wheeled automotive configuration comprising conventional steering and braking systems. In this embodiment, the drive train may be configurable for standard 2-wheel drive or 4-wheel all-terrain traction drive, and the propulsion system may be configurable as a gas engine, a turbine engine, an electric motor, and/or a hybrid gas/electric engine.

In some embodiments, the vehicle 101 is configured for water travel as a watercraft with a propulsion system comprising a gas engine, a turbine engine, an electric motor and/or a hybrid gas/electric engine, or any combination thereof. In some embodiments, the vehicle 101 is configured for hover travel as an over-land or over-water hovercraft or an air-cushion vehicle (ACV) and is configured with blowers to produce a large volume of air below the hull that is slightly above atmospheric pressure. In some embodiments, the vehicle 101 is configured for air travel as an aerial drone or aerial hovercraft and is configured with wings, rotors, blowers, rockets, and/or propellers and an appropriate brake system.

The vehicle 101 may further comprise an auxiliary solar power system to provide back-up emergency power or power for minor low-power sub-systems. In some embodiments, each vehicle of the vehicle fleet is configured with one or more power sources, such as battery, solar, gasoline, or propane. In some embodiments, the vehicle 101 further comprises a digital display for curated content comprising advertisements, marketing promotions, a public service notification, an emergency notification, or any combination thereof.

Each vehicle 101 in the fleet 100 may comprise a sensor system comprising a plurality of onboard sensors such as, for example, a camera, a video camera, a LiDAR, a radar, an ultrasonic sensor, and a microphone. Each vehicle 101 may further comprise an internal computer for real time navigation and obstacle avoidance, based on the data received by the sensors.

In some embodiments, the vehicles may further comprise an autonomous propulsion system sensor configured to monitor drive mechanism performance (e.g., the propulsion engine), power system levels (e.g., battery, solar, gasoline, propane, etc.), monitor drive train performance (e.g., transmission, tires, brakes, rotors, etc.), or any combination thereof.

In some embodiments, the vehicle is further configured to process or manufacture a good. In some embodiments, the vehicle is configured to process or manufacture the good in-transit. In some embodiments, the processed or manufactured good comprises: a beverage with or without condiments (such as coffee, tea, carbonated drinks, etc.), a fast food, a microwavable food, a reheatable food, or a rehydratable food. In some embodiments, the vehicle is equipped for financial transactions through debit or credit card readers.

In some embodiments, the vehicle 101 has a driving speed of about 1 mile per hour (mph) to about 90 mph, to accommodate inner-city, residential, and intrastate or interstate driving. In some embodiments, the vehicle 101 is configured for land travel. In some embodiments, each vehicle 101 in the fleet is configured with a working speed range from 13.0 mph to 45.0 mph. In some embodiments, the vehicle 101 is configured with a maximum speed range from 13.0 mph to about 90.0 mph. In some embodiments, vehicle 101 is configured for water travel as a watercraft and is configured with a working speed range from 1.0 mph to 45.0 mph. In some embodiments, the vehicle 101 is configured for hover travel as an over-land or over-water hovercraft and is configured with a working speed range from 1.0 mph to 60.0 mph. In some embodiments, the vehicle 101 is configured for air travel as an aerial drone or aerial hovercraft and is configured with a working speed range from 1.0 mph to 80.0 mph.

Primary and Secondary Compartments

Figure 2:
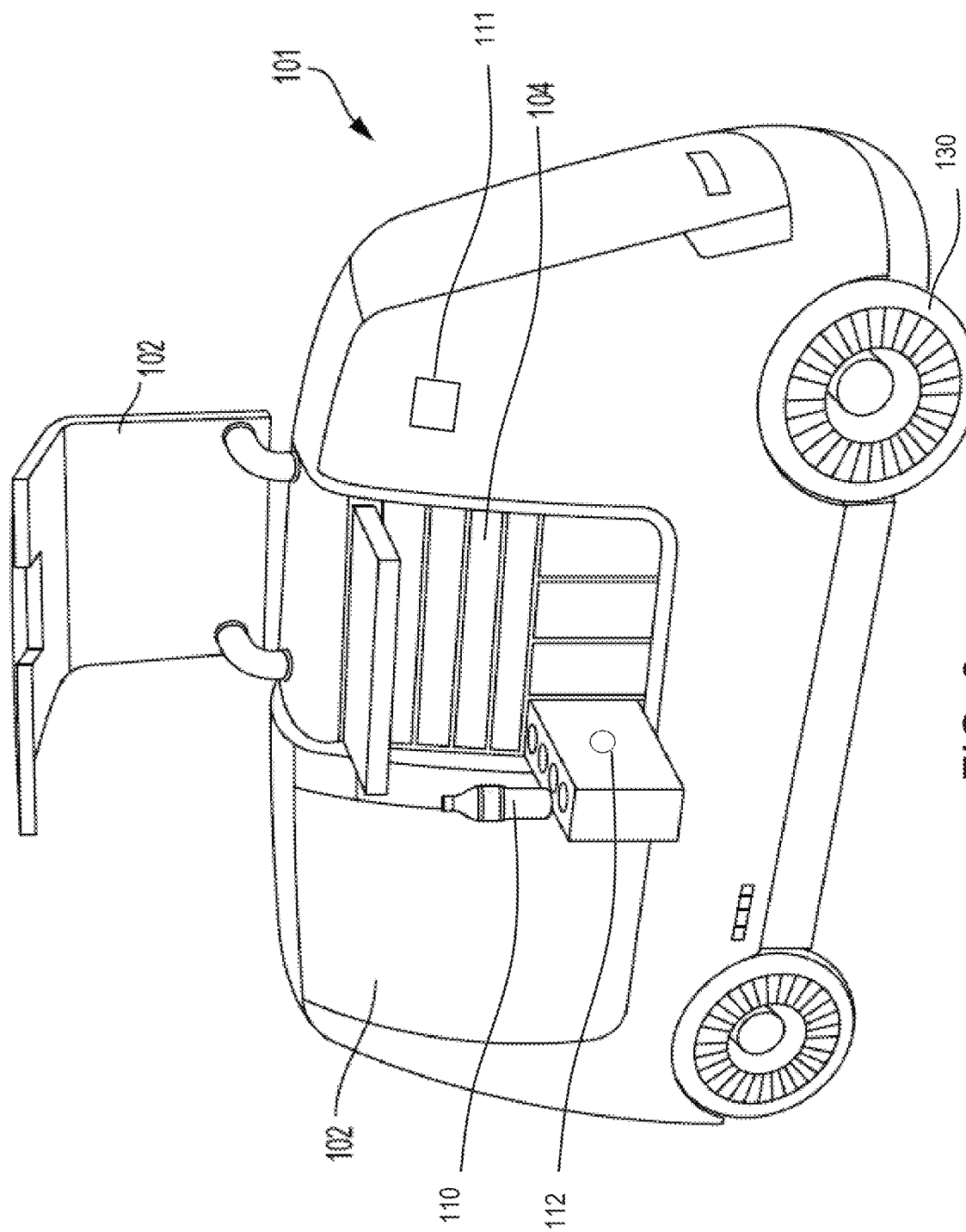
FIG. 2 is an perspective view of an exemplary autonomous vehicle comprising a plurality of compartments, in accordance with some embodiments.
Figure 3:
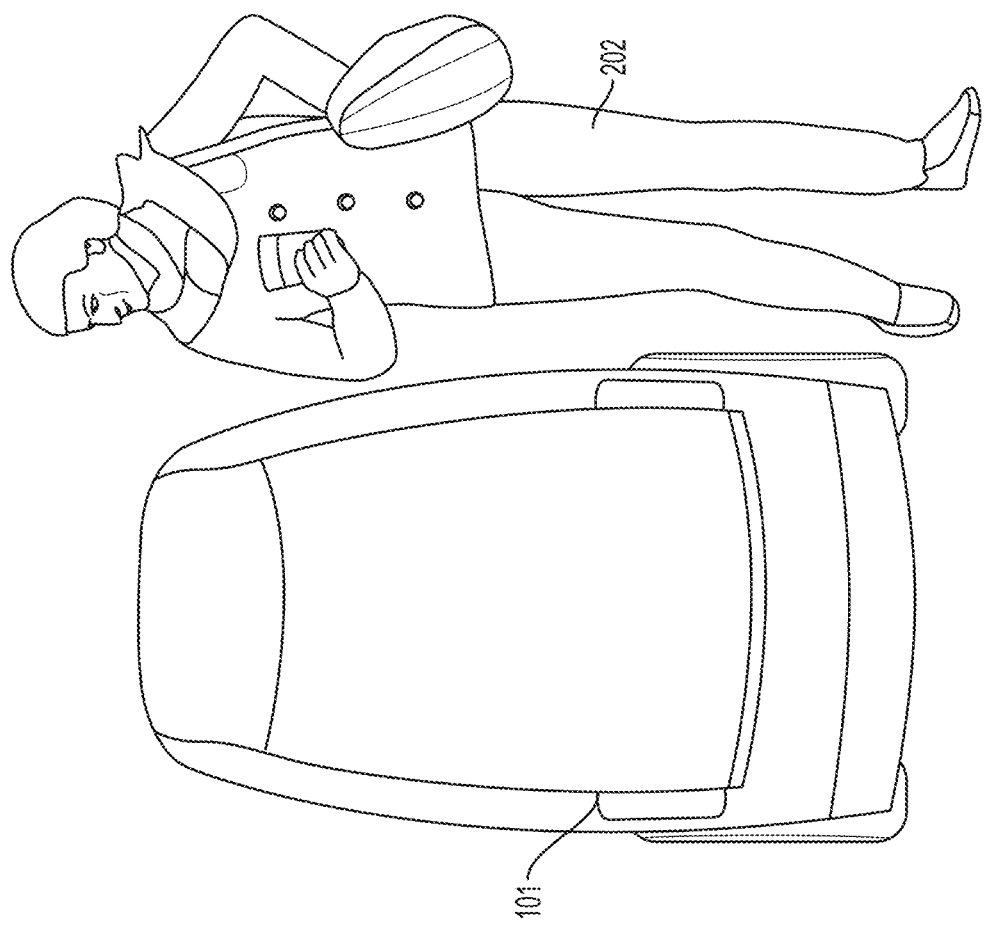
FIG. 3 is an front view of an exemplary autonomous vehicle beside a walking person, in accordance with some embodiments.
Figure 4:
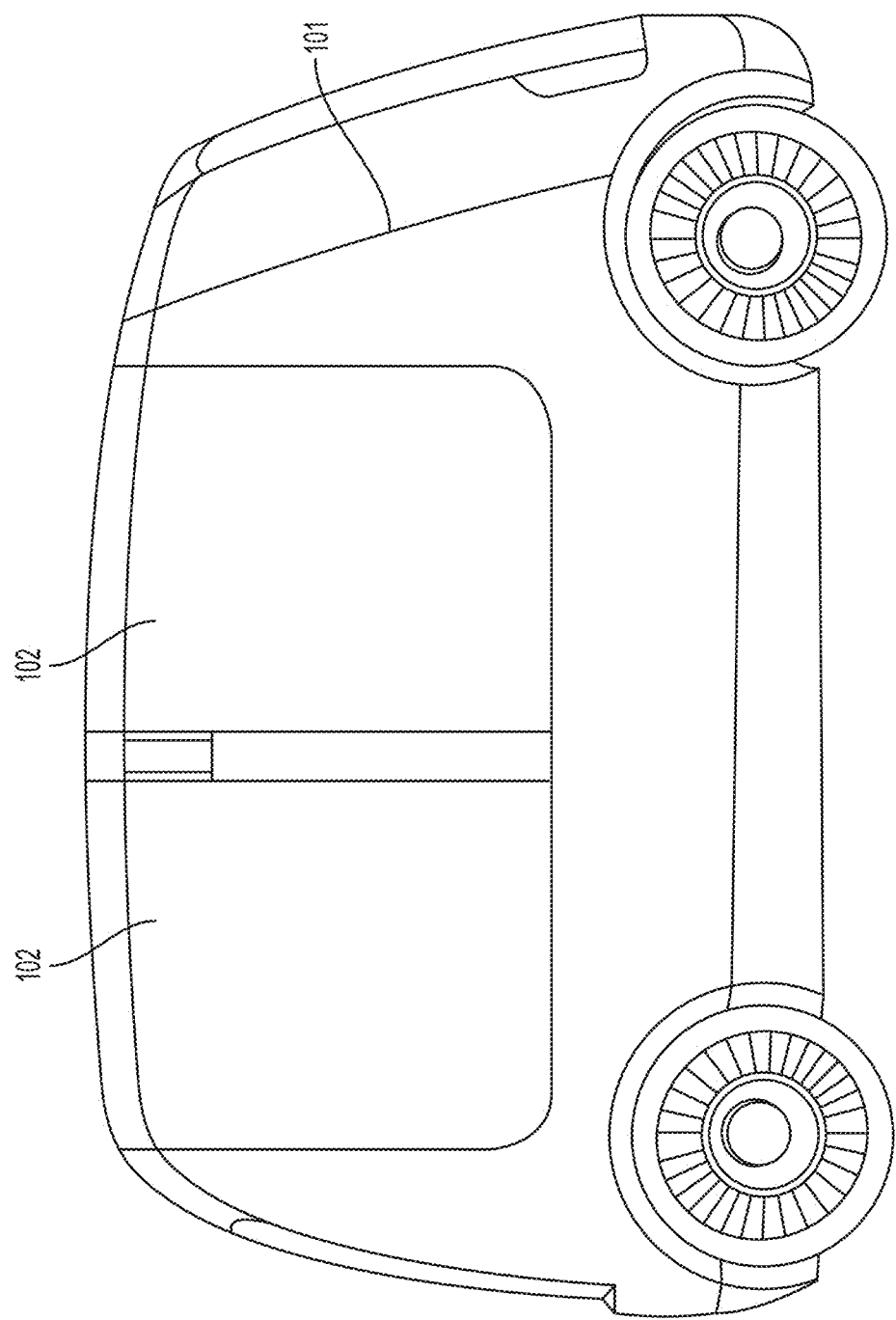
FIG. 4 is an right side view of an exemplary autonomous vehicle, in accordance with some embodiments.
Figure 5:
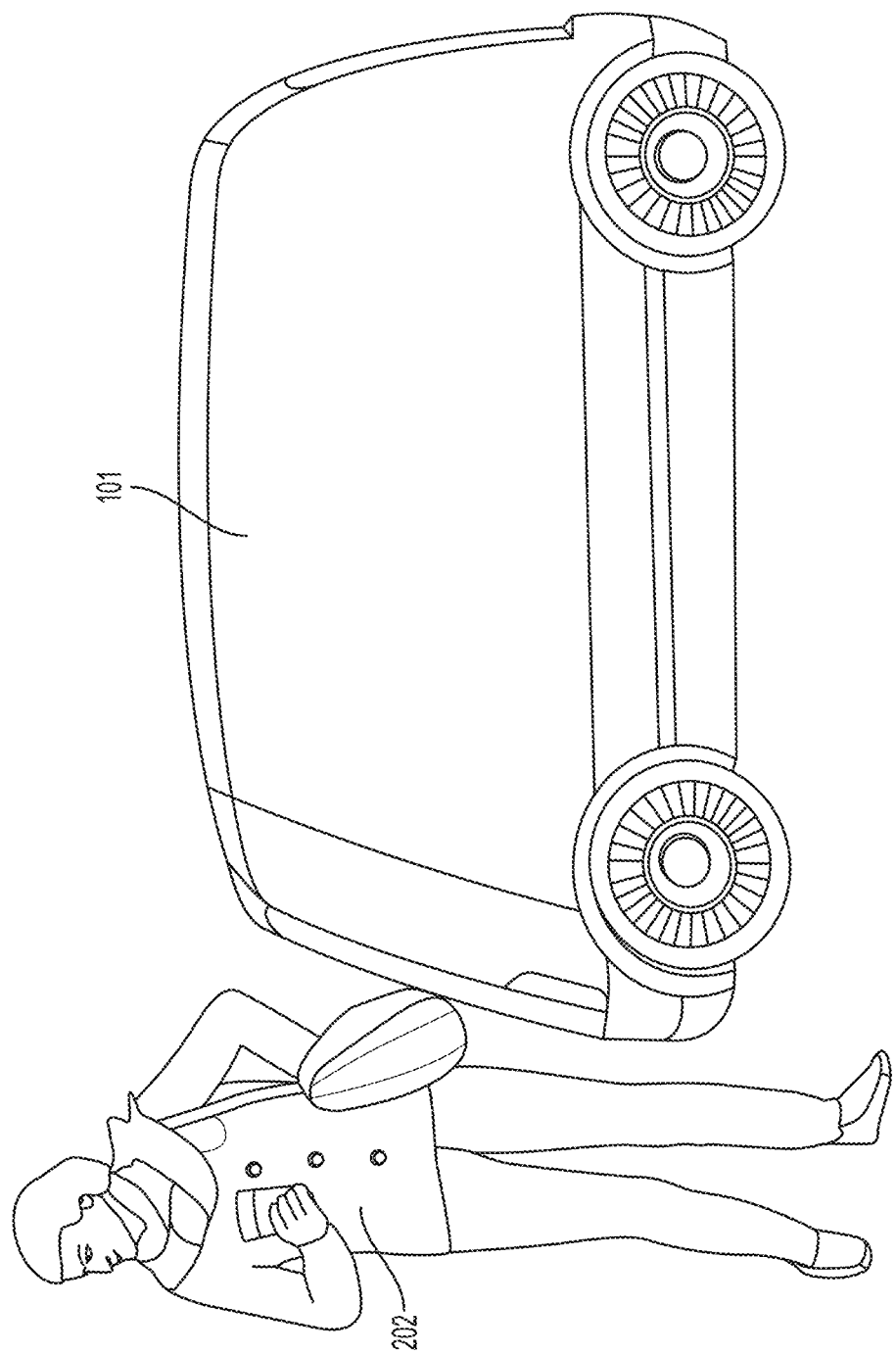
FIG. 5 is an left side view of an exemplary autonomous vehicle beside an average person, in accordance with some embodiments.
Figure 6:
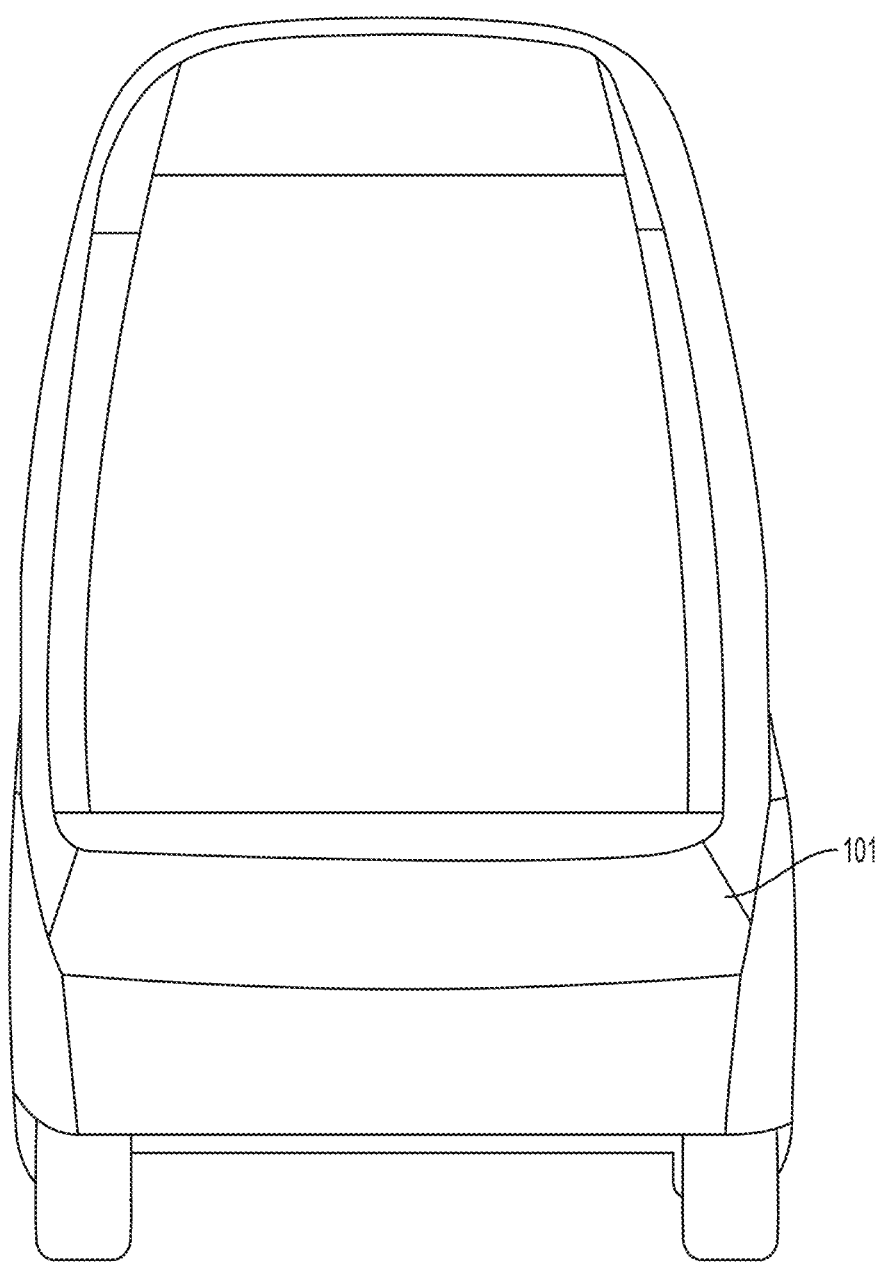
FIG. 6 is an rear view of an exemplary autonomous vehicle in accordance with some embodiments.
Figure 7:
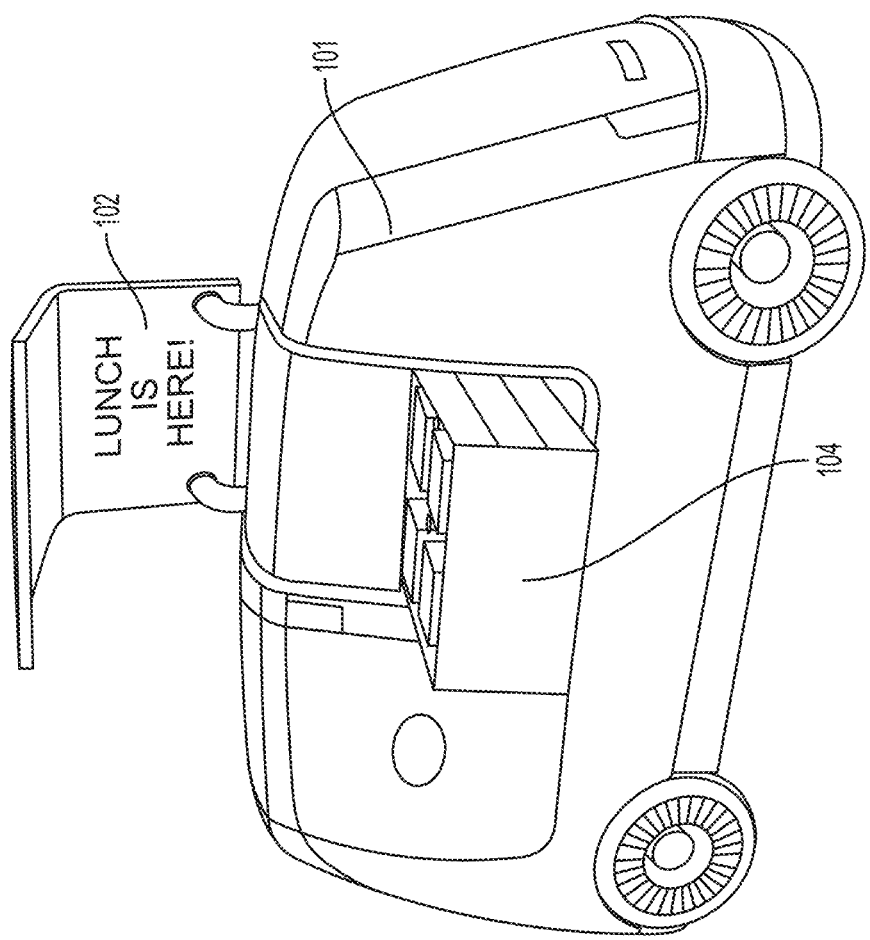
FIG. 7 is a perspective view of an exemplary food delivery autonomous vehicle, in accordance with some embodiments.

Provided herein, per FIG. 2, is an autonomous vehicle 101 comprising a plurality of compartments 102, 104. In some embodiments, the autonomous vehicle 101 comprises a primary compartment 102 and a secondary compartment 104 within the primary compartment 102. In some embodiments, the plurality of compartments are non-modular. In other embodiments, some of the compartments are modular while the other compartments are non-modular. In some embodiments, the plurality of compartments may be humidity and/or temperature controlled for: hot goods, cold goods, wet goods, dry goods, or combinations thereof. In some embodiments, the plurality of securable compartments is configurable for a plurality of goods. Exemplary compartments and goods comprise: bookshelves for books; thin drawers for documents; larger box-like drawers for packages; and sized compartments for vending machines, embedded coffee makers, pizza ovens, and dispensers. In some embodiments, the plurality of securable compartments may be configured and reconfigured based on: anticipated demands, patterns of behaviors, area of service, the types of goods to be transported, or any combination thereof. Alternately, the compartments may be configured to contain a set of goods to form a mobile marketplace (similar to a mini bar at a hotel).

Figure 8:
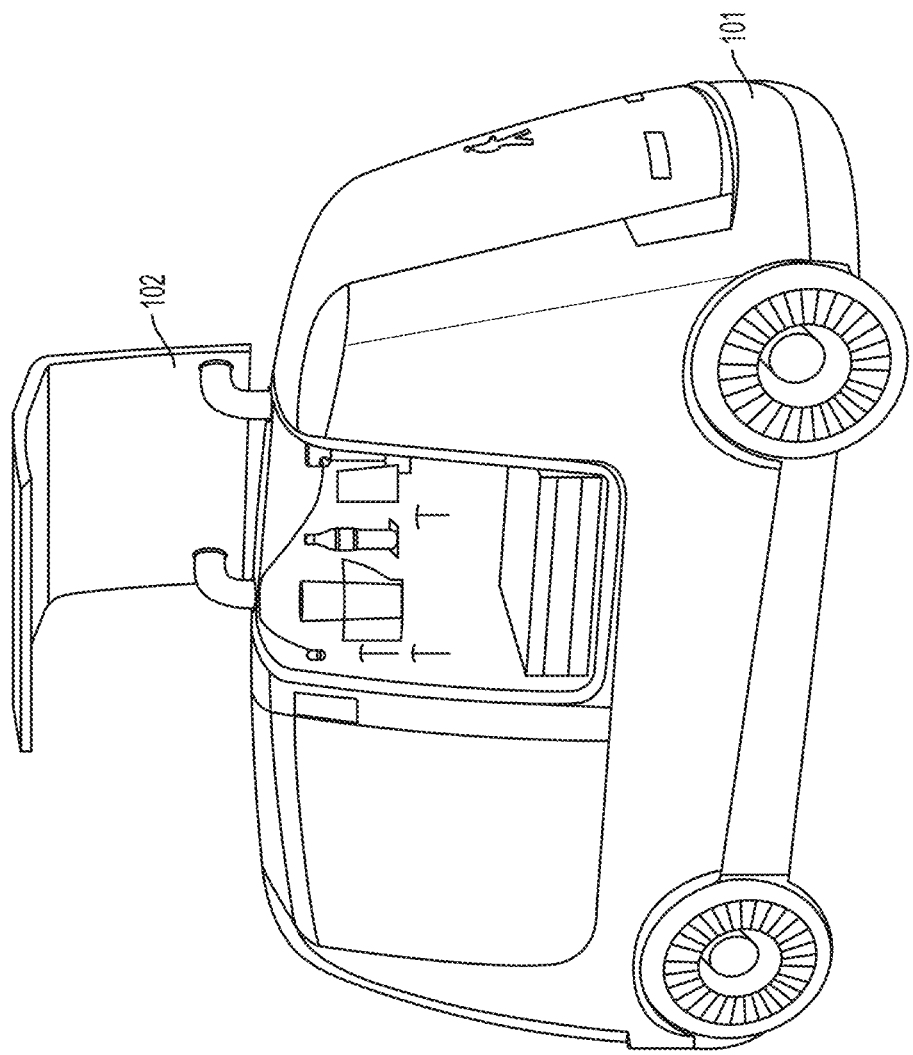
FIG. 8 is a perspective view of an exemplary pizza delivery autonomous vehicle, in accordance with some embodiments.
Figure 9:
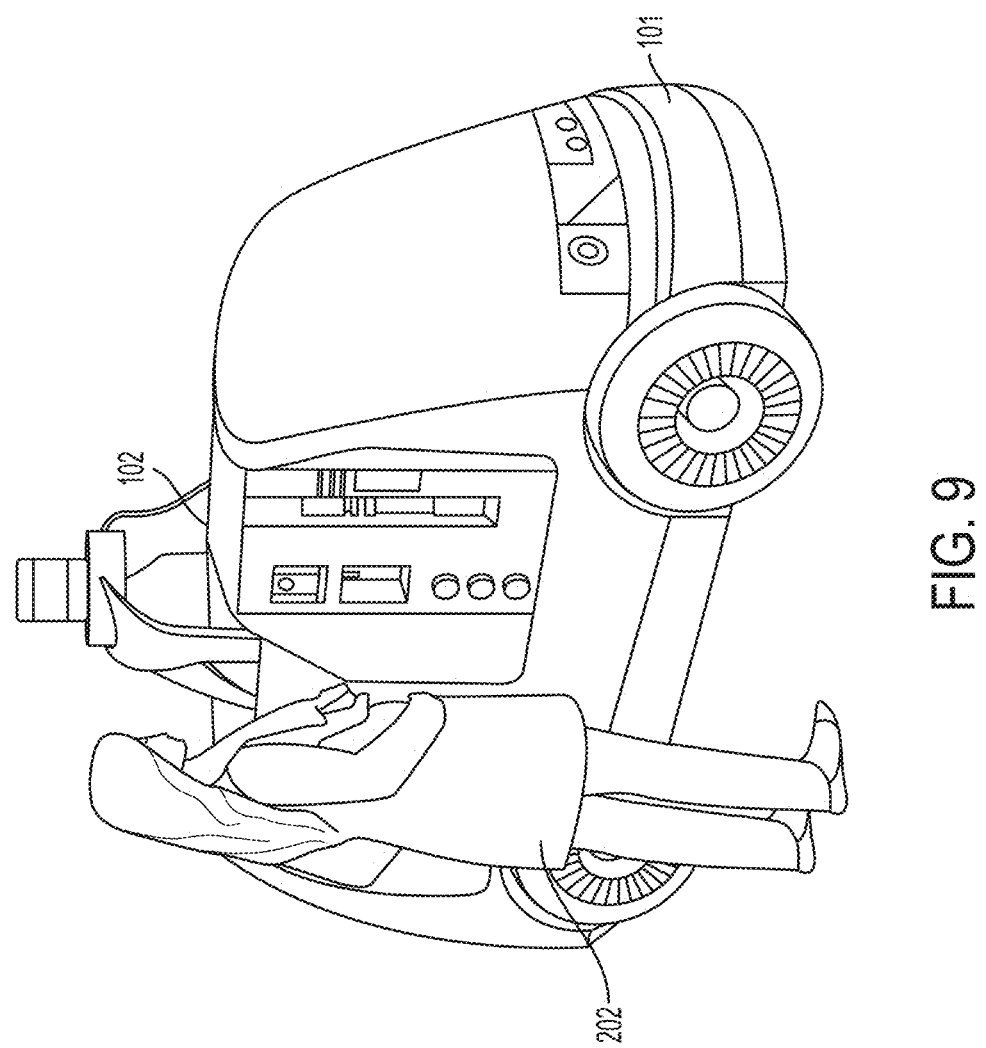
FIG. 9 is a perspective view of an exemplary coffee delivery autonomous vehicle, in accordance with some embodiments.
Figure 10:
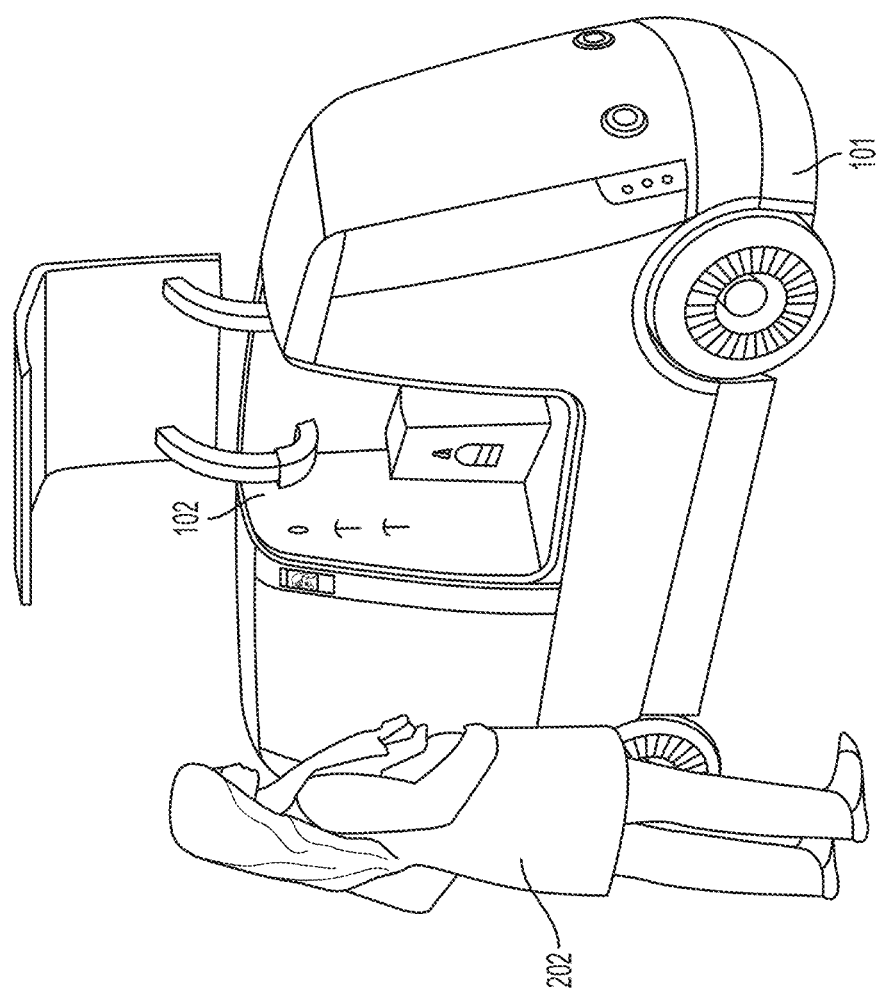
FIG. 10 is a perspective view of an exemplary meal delivery autonomous vehicle comprising a lighted interior, in accordance with some embodiments.

As illustrated in FIGS. 8-10, the compartment may comprise various additional amenities such as lights for night deliveries, condiment dispensers, and display screens.

Figure 11A:
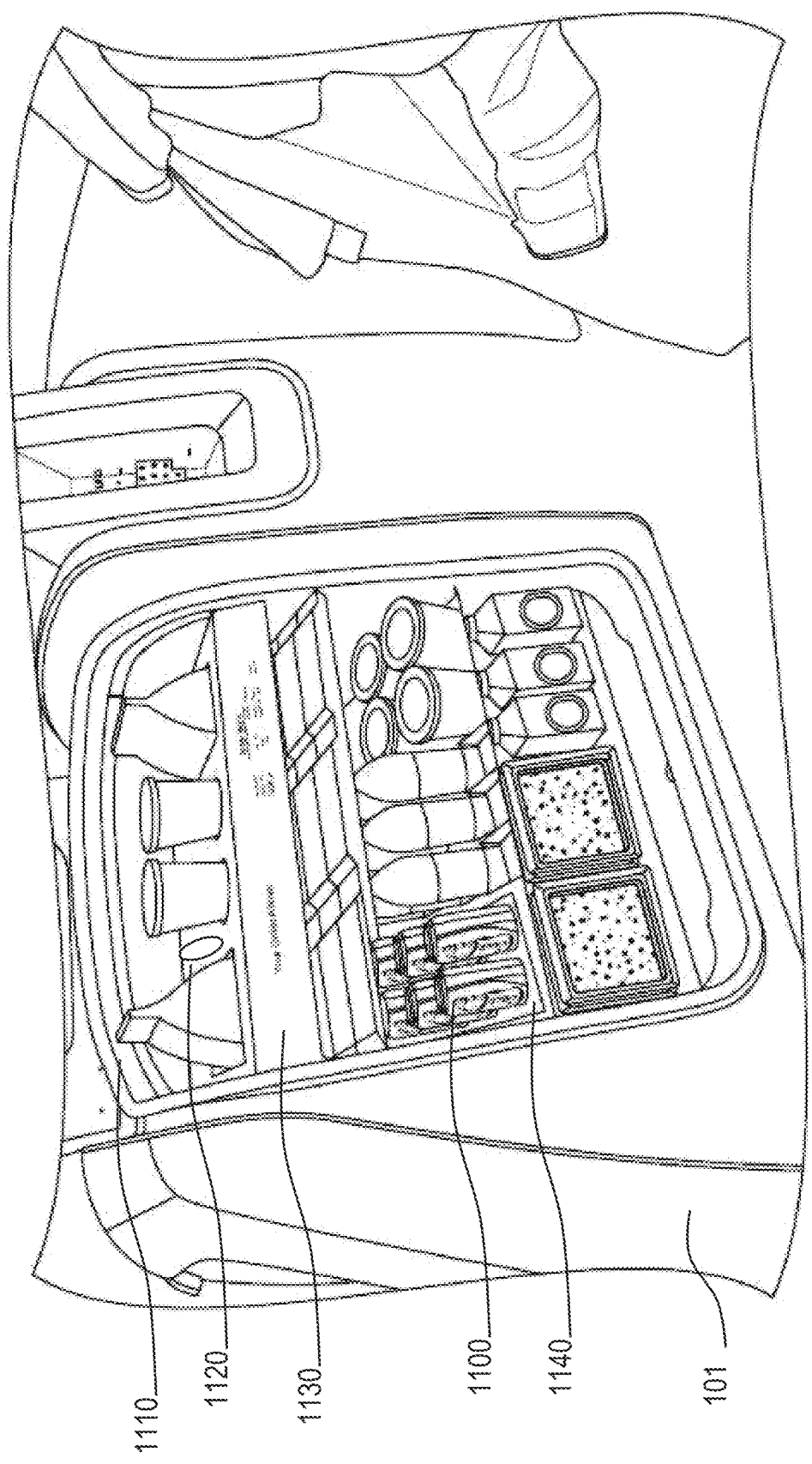
FIG. 11A is a perspective view of an exemplary autonomous vehicle, in accordance with some embodiments.
Figure 11B:
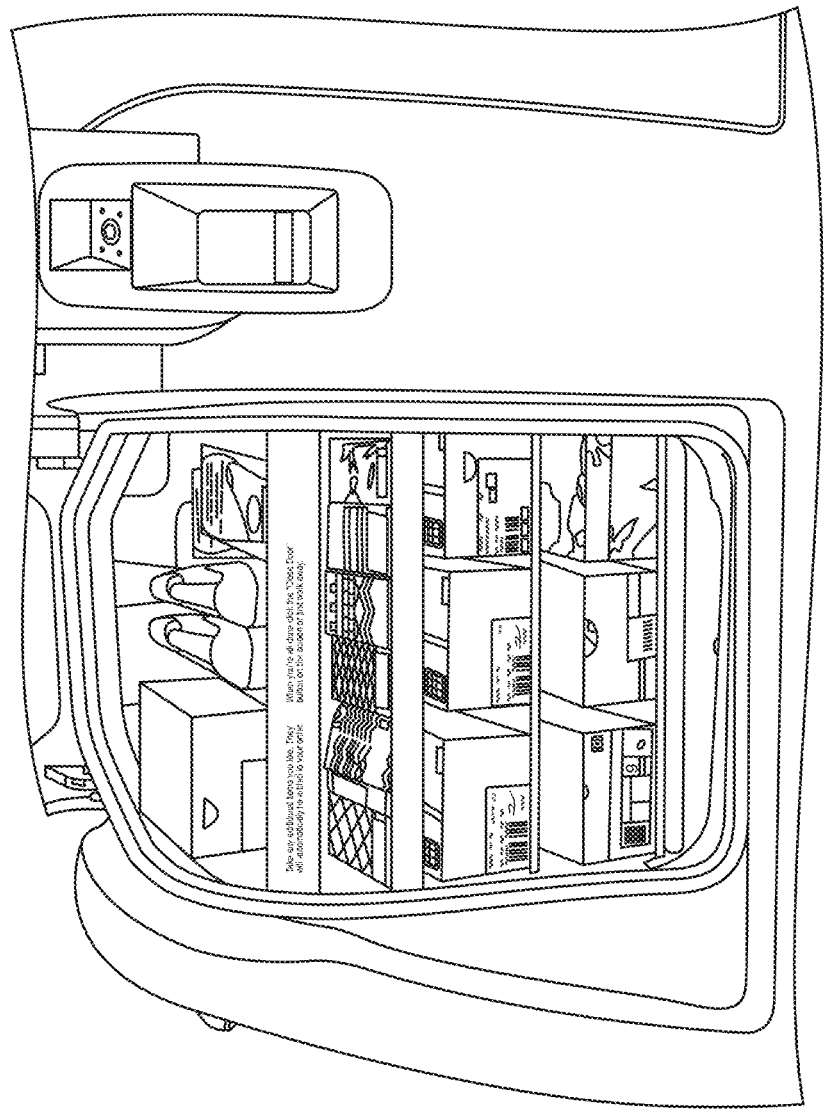
FIG. 11B is a perspective view of another exemplary autonomous vehicle, in accordance with some embodiments.

Provided herein, per FIG. 11A and FIG. 11B, is a reconfigurable autonomous vehicle 101 for displaying and vending an item 1100 to a consumer comprising a plurality of removable display cases 1110, an autonomous propulsion system, and a non-transitory computer-readable storage media encoded with a computer program including instructions executable by a processor to create an application.

In some embodiments, each display case 1110 comprises the item 1100, a display fastener 1120 and at least one of: a temperature control system configured to maintain a target temperature within the removable display case 1110; a display screen 1130 configured to display a case media; and a vending device 1140 configured to vend the item 1100. In some embodiments, the autonomous vehicle 101 further comprises a vehicle interior fastener configured to removably affix the display fastener 1120. The autonomous vehicle 101 may further comprise an energy storage device configured to provide energy to the removable display case 1110. In some embodiments, the energy storage device is further configured to provide power to the autonomous propulsion system, the display, the vending device, or any combination thereof.

In some embodiments, the application comprises a transmission module configured to receive an instruction from a fleet management module; the instruction comprising a route, and at least one of the target temperature and the case media; and a command module configured to communicate at least one of the target temperature and the case media to the removable display case 1110, and a navigation module configured to direct the autonomous propulsion system based on the route. In some embodiments, the command module is configured to communicate the target temperature, the media, or both to the removable display case through a communication hub. In some embodiments, the communication hub comprises a Wi-Fi router, a Bluetooth router, a cellular network, a jack, an outlet, a wire, or any combination thereof. In some embodiments, the route comprises a location of the consumer.

In some embodiments, the display fastener 1120 comprises a hook, a ring, a shelf, a bar, a spring, a bolt, a nut, a bearing, a bushing, a tie, a clip, a chain, a rack, or any combination thereof. In some embodiments, the vehicle interior fastener comprises a hook, a ring, a shelf, a bar, a spring, a bolt, a nut, a bearing, a bushing, a tie, a clip, a chain, a rack, or any combination thereof.

In some embodiments, the case media is based on the item 1100, the target temperature, the route, or any combination thereof. In some embodiments, the autonomous vehicle 101 further comprises a screen configured to display a vehicular media. In some embodiments, the vehicular media comprises the item, the target temperature, the media, the route, or any combination thereof.

In some embodiments, the autonomous vehicle 101 further comprises a lock configured to prevent unauthorized removal of the display case from the autonomous vehicle. In some embodiments, at least one of the vehicle interior fastener and the display fastener comprise the lock. In some embodiments, the autonomous vehicle 101 further comprises a strain relief configured to prevent damage to the autonomous vehicle, the display case, the energy storage device the autonomous propulsion system, or any combination thereof.

In some embodiments, the autonomous vehicle 101 further comprises at least one of a power outlet, a data port, and an exhaust port. The power outlet may be configured to provide one or more power ratings to removable display case 1110 to power the display screen and/or any additional electrical components within the removable display case 1110. The data port may enable data transmission to and/or from the removable display case 1110 and transmission module and the command module. The data may comprise a stock of items within the removable display case 1110, a current temperature removable display case 1110, the case media, a price associated with the item 1100, or any combination thereof.

At least one of the autonomous vehicle and the compartment may comprise a controller configured to associate each one of the plurality of securable compartments 102, 104 to an assigned customer or provider and provide entry to the securable compartments 102, 104 upon authorization. Each securable compartment 102, 104 may be secured separately to transport goods to separate sets of customers. As such, the autonomous vehicle may deliver a first good or service to a first assigned customer from within a first securable compartment 102 and then deliver a second good or service to a second assigned customer from within the second securable compartment 104.

Upon arrival of the autonomous vehicle to the customer destination, the customer may open their respective compartment(s) by verifying their identity. In one embodiment, the customer verifies their identity by providing a PIN (e.g., 4 digit number) via a touchscreen or a keypad within the autonomous vehicle, which they received upon initial request/order. The customer may verify themselves using their mobile phone and an RFID reader on the autonomous vehicle. Alternatively, the customer is verified through voice recognition of a keyword or key-phrase, wherein the autonomous vehicle comprises a microphone and a voice recognition application for recognition thereof. Further, in another embodiment, the customer is verified through facial or identification recognition, wherein the autonomous vehicle comprises a camera and a facial recognition application for recognition thereof. Additionally or alternatively, the customer is verified through a magnetic strip, RFID key or any other computer readable form of identification. Finally, in another embodiment, the customer is verified by entering a code or identification value on their mobile device, wherein the autonomous vehicle receives a cellular signal comprising a confirmation of the user or data related to the code of identification of the user.

In some embodiments, the vehicle could be configured for water travel, providing at least one and preferably two large storage compartments, and more preferably, at least one large compartment is configured with a plurality of smaller internal secure compartments of variable configurations to carry individual items that are to be delivered to, or need to be retrieved from customers. Further still, in some embodiments, the vehicle could be configured for hover travel, providing at least one and preferably two large storage compartments, and more preferably, at least one large compartment is configured with a plurality of smaller internal secure compartments of variable configurations to carry individual items that are to be delivered to, or need to be retrieved from customers. Further still, in some embodiments, the vehicle could be configured for aerial drone or aerial hover travel, providing at least one and preferably two large storage compartments, and more preferably, at least one large compartment is configured with a plurality of smaller internal secure compartments of variable configurations to carry individual items that are to be delivered to, or need to be retrieved from customers.

Fleet Management Module

Figure 12:
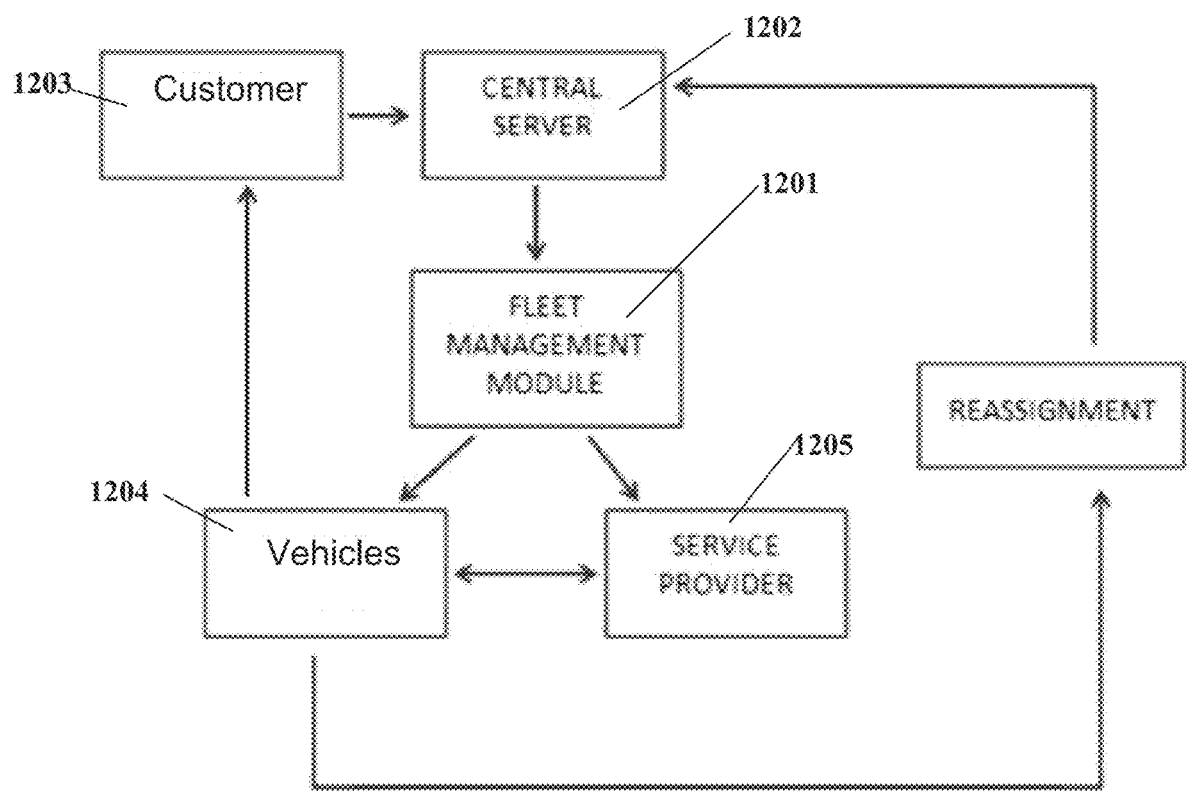
FIG. 12 is a flowchart of an exemplary fleet control system, in accordance with some embodiments.

Provided herein, per FIG. 12, is a system for fleet management comprising a fleet management module 1201, a central server 1202, a vehicle 1204, a customer 1203, and a service provider 1205. In some embodiments, the fleet management module 1201 coordinates, assigns tasks, and monitors the position of each of the plurality of vehicles 1204 in the fleet. The fleet management module 1201 may coordinate the vehicles 1204 in the fleet to monitor and collect data regarding unstructured open or closed environments, and report to the service provider 1205. As seen, the fleet management module 1201 may coordinate with a central server 1202. The central server 1202 may be located in a central operating facility owned or managed by the fleet owner. The service provider 1205 may comprise a third party provider of a good or service. The service provider 1205 may comprise a vendor, a business, a restaurant, a delivery service, a retailer, or any combination thereof.

In some embodiments, the fleet management module 1201 is configured to receive, store and transmit data to and/or from the service provider 1205. The fleet management module 1201 may receive and transmit data to and/or from the service provider 1205 via a service provider application. In some embodiments, the service provider application comprises a computer application, an internet application, a tablet application, a phone application, or any combination thereof.

In some embodiments, the central server 1202 is configured to receive, store and transmit data to and/or from the customer 1203. The central server 1202 may receive and transmit data to and/or from the customer 1203 via a customer application. In some embodiments, the customer application comprises a computer application, an internet application, a tablet application, a phone application, or any combination thereof.

In some embodiments, the vehicle 1204 comprises a memory device to store the data for future data transfer or manual download.

In one example, an order by a customer 1203 is transmitted to a central server 1202, which then communicates with the fleet management module 1201, which relays the order to the service provider 1205 associated with the order and a vehicle 1204. The fleet management module 1201 may employ one or more vehicles 1204 or sub-fleet vehicles 1204 that are closest to the service provider 1205, customer 1203, or both. The assigned service provider then interacts with that vehicle 1204 through a service provider application to supply the vehicle 1204 with any goods, maps, or instructions associated with the order. The vehicle 1204 then travels to the customer 1203 and reports completion of the order to at least one of the customer 1203, the service provider 1205, the central server 1202, and the fleet management module 1201.

In some embodiments the vehicle 1204 may be operated on behalf of the service provider 1205, wherein at least one of the central server 1202 and the fleet management module 1201 is operated by the service provider 1205. In any one of the embodiments, the vehicle 1204 is controlled directly by the customer 1203, the service provider 1205, or both. In some embodiments, human interaction of the vehicle 1204 may be required to address maintenance issues such as mechanical failure, electrical failure or a traffic accident.

In one example, the fleet management module 1201 receives an instruction from the service provider 1205 to collect an item at a first location and deliver the item to a second location. Upon receipt of the instruction, the fleet management module 1201 may assign one or more of the vehicles 1204 to perform the instruction by navigating the one or more of the vehicles 1204 the first location. The one more of the vehicles 1204 may then confirm the receipt of the item and navigate to the second location. The one more of the vehicles 1204 may then deliver the item to the second location and confirm receipt of the delivery. In some embodiments, the one more of the vehicles 1204 may further receive an identification associated with the first location, the second location, or both, to enable receipt and delivery of the item.

In one example, a request by the customer 1203 is sent to the central server 1202, which then communicates with the fleet management module 1201 to relay the request to the service provider 1205, which instructs the vehicles 1204. The fleet management module 1201 may select one or more of the vehicles 1204 within the geographic region and/or proximity of the customer 1203, the service provider 1205, or both. The vehicles 1204 may be first directed to a location associated with the service provider 1205 to receive an item associated with the request. The vehicle 1204 may then travels to a location associated with the customer 1203. The customer 1203 may then interacts with the one or more vehicle 1204 to retrieve the item. The customer 1203 may retrieve the item by opening a compartment within the vehicle 1204. The customer 1203 may open the compartment within the vehicle 1204 through a customer application, or a customer interface comprising, for example, an RFID reader, a touchpad, a keypad, a voice command, or a vision-based recognition. Upon completion the vehicles 1204 may then report a completion of the request to the fleet management module 1201 and be reassigned to a subsequent request.

In some embodiments, the autonomous fleet may be strategically positioned throughout a geographic region in anticipation of a known demand. Demand for autonomous vehicle services may be predicted by storing historical demand data relating to the quantity, timing, and type of request received in each region. Such demand predictions may further be weighted by the cost or importance of the good or service and employ historical trends for higher efficiency and throughput. As such, the fleet management module may position the autonomous vehicles as close as possible to the expected source locations.

Figure 13:
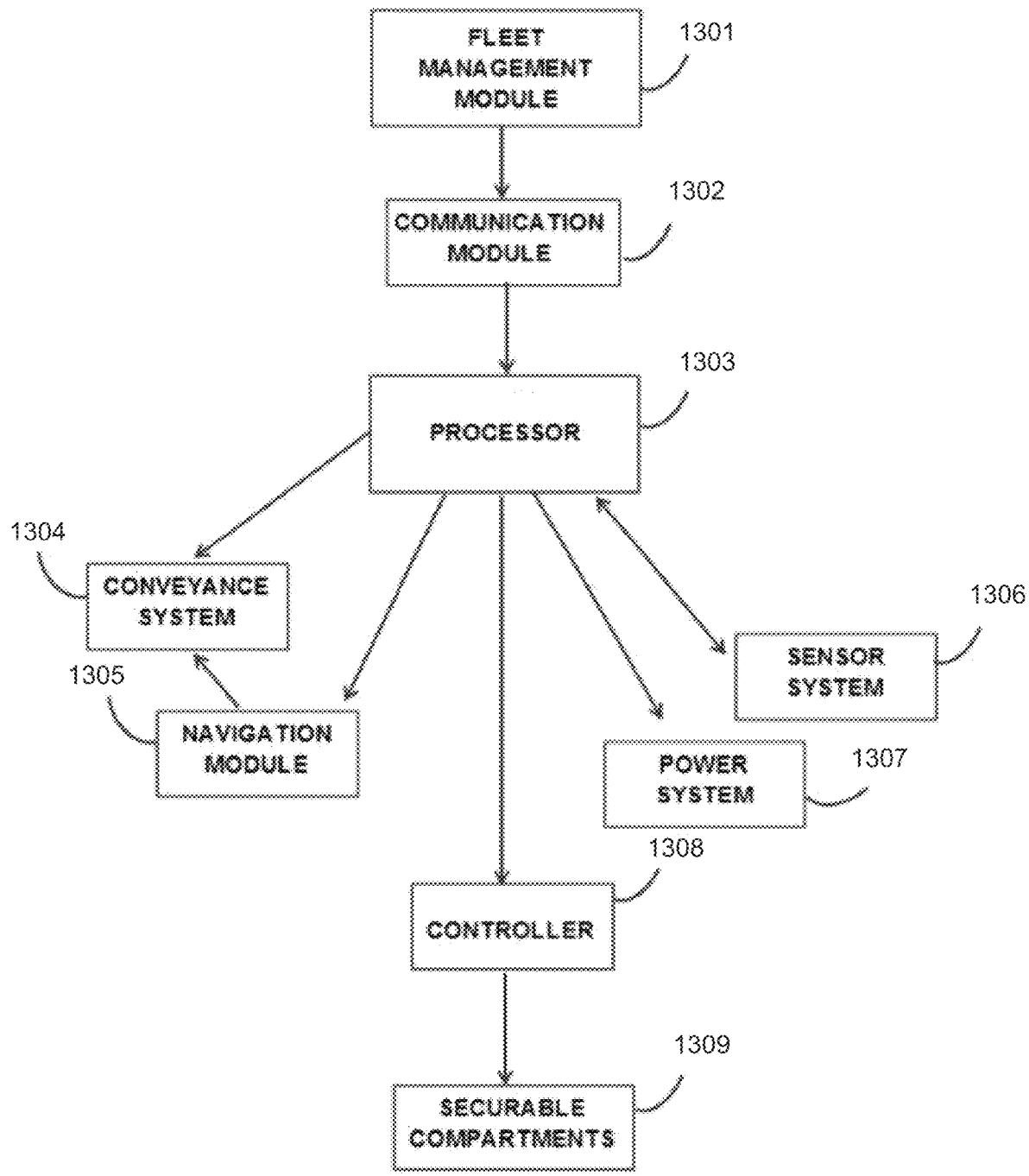
FIG. 13 is a flowchart of an exemplary fleet control module, in accordance with some embodiments.

Per FIG. 13, the fleet management module 1301 instructs the processor 1303 of the autonomous or semi-autonomous vehicle via a communication module 1302. The processor 1303 may be configured to send an instruction and receive a sensed data from the sensor system 1306, and may further control at least one of the power system 1307, the navigation module 1305, and the conveyance system 1304. The processor 1303 may additionally be configured to instruct a controller 1308 to open a securable compartment 1309 to release any contents associated with an order. The processor 1303 may allow manual override of the conveyance system 1304, the navigational system 1305, or both.

In some embodiments, the processor 1303 is in functional communication with the communication module 1302. In some embodiments, the communication module 1302 is adapted to receive, store, and/or transmit data to and from the customer and the fleet management module 1301. In some embodiments, the data comprises a schedule, a request or order, a current location, a delivery location, a service provider location, a route, an estimated time of arrival (ETA), a repositioning instruction, a vehicle condition, a vehicle speed, or any combination thereof. In some embodiments, the processor 1303 is capable of both high-level computing for processing as well as low-level safety-critical computing capacity for controlling the hardware. The processor 1303 may configured to direct the conveyance system 1304, the navigation module 1305, the sensor system 1306, the power system 1307, the controller 1308, or any combination thereof. The processor 1303 may reside aboard the autonomous or semi-autonomous vehicle, or at a remote location.

In some embodiments, the communication module 1302 is configured to receive, store and transmit data via wireless transmission (e.g., 4G, 5G, or satellite communications). In some embodiments, the wireless transmission occurs via: a central server, a fleet management module, a mesh network, or any combination thereof. In some embodiments, the customer application is configured to send and receive data via an electronic device comprising a phone, a personal mobile device, a personal digital assistant (PDA), a mainframe computer, a desktop computer, a laptop computer, a tablet computer, and/or wearable computing device comprising: a communication headset, smart glasses, or a combination thereof.

In some embodiments, the fleet management module 1301 directs each of the vehicles 1204 through a navigation module 1305. In some embodiments, the navigation module 1305 controls the conveyance system 1304 to translate the autonomous or semi-autonomous vehicle through the unstructured open or closed environments. In some embodiments, the navigation module 1305 comprises an HD maps, a weather condition, an elevation map, a digital map, a street view photograph, a GPS point, or any combination thereof. In some embodiments, the map is generated by a customer, a customer, a service provider, a fleet operator, an online repository, a public database, or any combination thereof. In some embodiments, the map is generated only for intended operational geography. The maps may be augmented or confirmed by data obtained by the sensor system 1306. The navigation module 1305 may further implement data collected by the sensor system 1306 to determine the location and/or the surroundings of the autonomous or semi-autonomous vehicle. In some embodiments, the map further comprises a navigation marker comprising a lane, a road sign, an intersection, a grade, or any combination thereof. As such the navigation module 1305, in combination with processors and/or applications vehicles 1204 enable a safe, robust navigation trajectory.

In some embodiments, the fleet management module 1301 is configured to determine and predict a geographic demand for the autonomous or semi-autonomous vehicles for strategic placement throughout a geographic region in anticipation of a known demand. The fleet management module 1301 may determine and predict a geographic demand by storing data relating the location, quantity, time, price, item, item type, service, service type, service provider, or any combination thereof of placed orders and requests. Further, the service provider may provide independently measured trends to supplement or augment the measured trends. As such, the vehicles may be strategically placed to reduce transit and idle time and to increase sales volume and efficiency.

Vehicle Configured to Receive a Modular Unit

Figure 17:
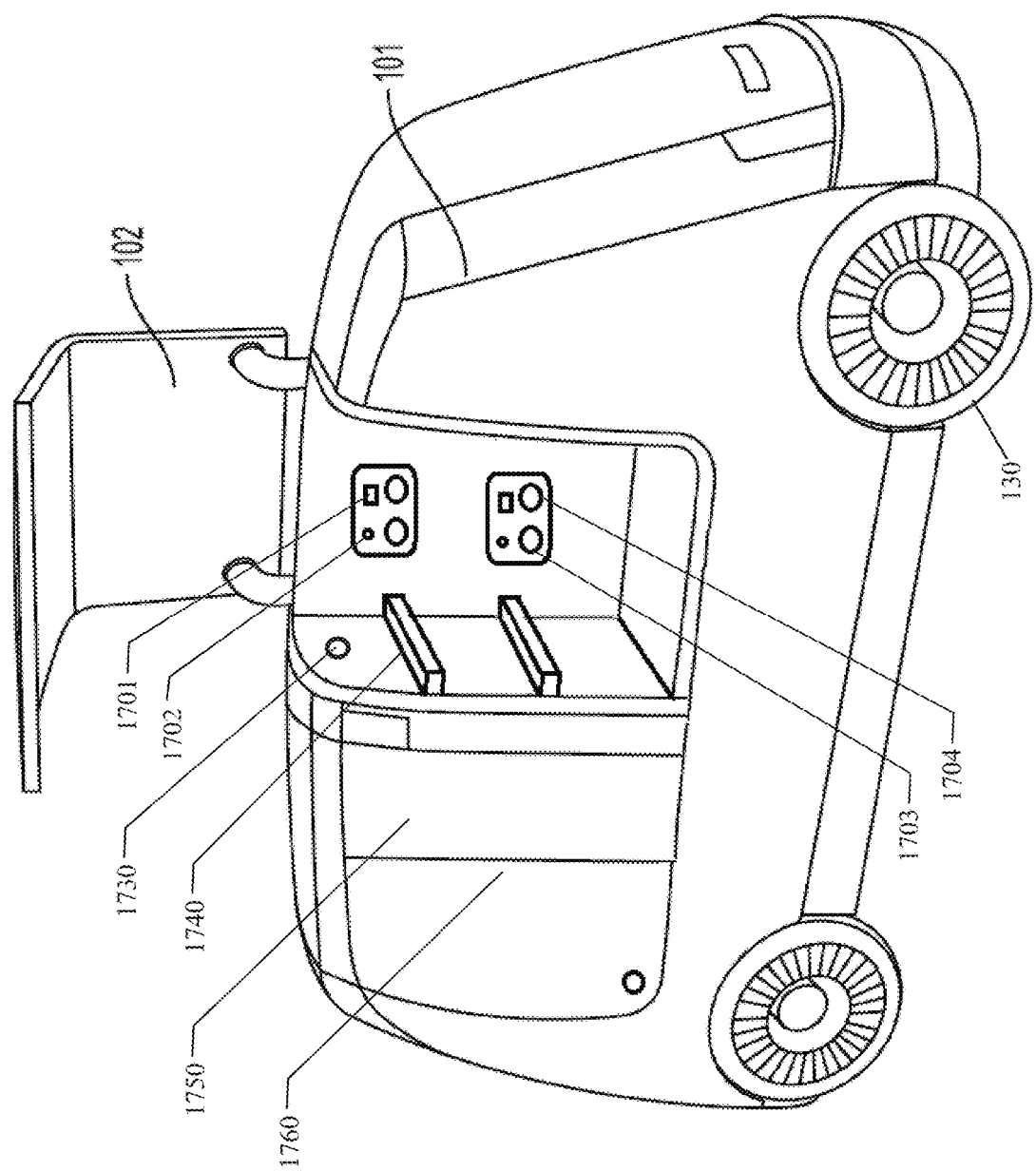
FIG. 17 is a perspective view of an exemplary autonomous vehicle configured to receive a modular unit, in accordance with some embodiments.
Figure 18:
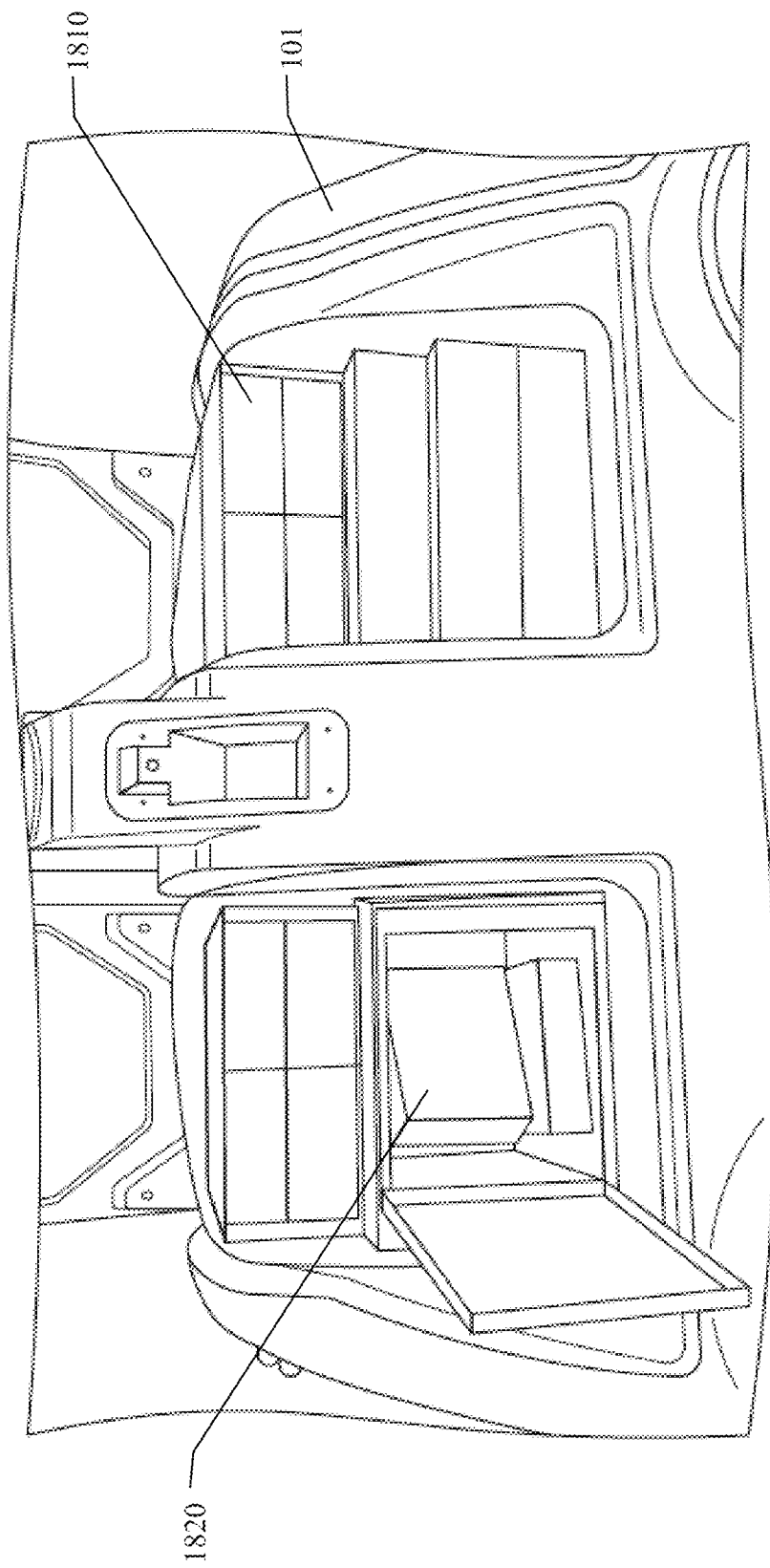
FIG. 18 is a perspective view of an exemplary autonomous vehicle with modular units, in accordance with some embodiments.

Provided herein, per FIGS. 17 to 18, is an autonomous or semi-autonomous land vehicle 101 configured to receive a modular unit 1810, the vehicle 101 comprising: an energy storage device 1760; a communication device 1750; an autonomous or semi-autonomous land propulsion system 130; a vehicle interior fastener 1740; a non-transitory computer-readable storage media; and at least one of: a vehicle power port 1702; vehicle data port 1701; a vehicle cooling/heating port 1703; and a vehicle exhaust port 1704.

In some embodiments, the vehicle 101 is configured to receive two or more modular units 1810. In some embodiments, the vehicle 101 is configured to receive 3 to 50 modular units 1810. In some embodiments, the vehicle 101 is configured to receive 3, 4, 5, 6, 8, 10, 15, 20, 30, 40, 50 or more modular units 1810 or increments therein. In some embodiments, per FIG. 18, the modular unit 1810 is configured to secure a consumer product 1820. In some embodiments, the consumer product 1820 comprises a food item, a beverage item, an electronics item, a clothing item, or any combination thereof. In some embodiments, the vehicle 101 comprises an interior compartment 102, and wherein the vehicle interior fastener 1740 is configured to reversibly affix the modular unit 1810 within the interior compartment 102. In some embodiments, the vehicle 101 further comprises a permanently fixed modular unit. The permanently fixed modular unit may comprise a shelf, a display, an input device, or any combination thereof.

In some embodiments, the vehicle interior fastener 1740 is configured to reversibly affix the modular unit 1810 to the vehicle 101. In some embodiments, the vehicle interior fastener 1740 comprises a hook, a ring, a shelf, a bar, a spring, a rail, a slide, a bolt, a nut, a bearing, a bushing, a tie, a clip, a chain, a rack, a magnet, or any combination thereof. In some embodiments, the vehicle 101 further comprises a plurality of vehicle interior fasteners 1740, the plurality of vehicle interior fasteners 1740 comprising a first vehicle interior fastener 1740 configured to reversibly affix a first type of modular unit 1810 and a second vehicle interior fastener configured to reversibly affix a second type of modular unit. In some embodiments, the vehicle interior fastener 1740 comprises at least one of the vehicle power port 1702, the vehicle data port 1701, the vehicle cooling/heating port 1703, and the vehicle exhaust port 1704. In some embodiments, the vehicle 101 further comprises a lock configured to prevent unauthorized removal of the modular unit 1810 from the vehicle 101. In some embodiments, the vehicle interior fastener 1740 comprises the lock.

The vehicle power port 1702 may be configured to transmit power from the energy storage device 1760 to the modular unit. In some embodiments, the vehicle power port 1702 comprises a plug, a socket, a connector, a wire, a cable, a wireless power connector, or any combination thereof. The vehicle data port 1701 may communicatively connect the modular unit 1810 and the transmission module. In some embodiments, the vehicle data port 1701 comprises a plug, a socket, a connector, a wire, a cable, a wireless connector, a Bluetooth connector, or any combination thereof. The vehicle cooling/heating port 1703 may be configured to heat the modular unit 1810, cool the modular unit 1810, or both. The vehicle cooling/heating port 1703 may be alternatively or further configured change the condition of air within the modular unit 1810 in temperature of any degree and in any direction. In some embodiments, vehicle cooling/heating port 1703 may also be configured to alter a humidity or any other quality of the air within the modular unit 1810. In some embodiments, the vehicle 101 further comprises a temperature control system configured to provide heat to the modular unit 1810, cool the modular unit 1810, or both. In some embodiments, the vehicle 101 further comprises a humidifier configured to alter an air quality within the modular unit 1810. The vehicle cooling/heating port 1703 may comprise a push to connect connector, a quick connector, a jack, a fitting, a duct, or any combination thereof. The vehicle exhaust port 1704 may be configured to receive an exhaust from the modular unit 1810. The vehicle air exhaust port 1704 may comprise a push to connect connector, a quick connector, a jack, a fitting, a duct, or any combination thereof. In some embodiments, the vehicle 101 comprises two or more of the vehicle interior fastener 1740, the non-transitory computer-readable storage media, and at least one of: the vehicle power port 1702, vehicle data port 1701, the vehicle cooling/heating port 1703, or the vehicle exhaust port 1704. In some embodiments, the temperature control system is disposed away from the vehicle.

In some embodiments, the non-transitory media is encoded with a computer program including instructions executable by a processor to create an application comprising a navigation module and a transmission module. In some embodiments, the navigation module receives at least a location via the communication device 1750 and directing the autonomous or semi-autonomous land propulsion system 130 based at least on the location. In some embodiments, the transmission module transmits an output data, receiving an input data, or both, via the communication device 1750, to a command center. In some embodiments, the input data comprises a modular unit 1810 temperature target, a modular unit 1810 display data, a modular unit 1810 indicator data, a modular unit 1810 access data, or any combination thereof. In some embodiments, the output data comprises a presence of a consumer product 1820 secured by the modular unit, a modular unit 1810 access status, a current modular unit 1810 temperature, a modular unit 1810 stock, a modular unit 1810 type, or any combination thereof.

In some embodiments, the communication device 1750 comprises a Wi-Fi communication device, a Bluetooth communication device, a cellular communication device, a satellite communication device, or any combination thereof. In some embodiments, the vehicle data port 1701 comprises a wired data interface, a Wi-Fi communication device, a Bluetooth communication device, a cellular communication device, or any combination thereof.

In some embodiments the vehicle 101 further comprises a sensor 1730. In some embodiments, the sensor 1730 comprises a camera, a video camera, a LiDAR, a RADAR, a microphone, a radiation sensor, a chemical sensor, a light sensor, a tactile sensor, or any combination thereof. In some embodiments, the sensor 1730 is configured to measure a sensed data corresponding to the modular unit. In some embodiments, the vehicle data port 1701 receives data from the sensor 1730.

Modular Units

Another aspect provided herein, per FIGS. 19A to 19D is a modular unit 1810a 1810b configured to be removably disposed within an autonomous or semi-autonomous land vehicle comprising: a modular unit fastener 1940 and at least one of: a modular unit power port 1902; a modular unit data port 1901; a modular unit cooling/heating port 1903; and a modular unit exhaust port 1904.

The modular unit fastener 1940 may be configured to reversibly attach to the vehicle. The modular unit power port 1902 may be configured to receive power from the vehicle. The modular unit data port 1901 may be configured to receive an input data from the vehicle, transmit an output data to the vehicle, or both. The modular unit cooling/heating port 1903 may be configured to receive heat from the vehicle, receive cooling from the vehicle, or both. The modular unit exhaust port 1904 may be configured to emit an exhaust to the vehicle.

In some embodiments, the modular unit fastener 1940 comprises a hook, a ring, a shelf, a bar, a spring, a rail, a slide, a bolt, a nut, a bearing, a bushing, a tie, a clip, a chain, a rack, a magnet, or any combination thereof. In some embodiments, the modular unit fastener 1940 comprises at least one of the modular unit power port 1902, the modular unit data port 1901, the modular unit cooling/heating port 1903, and the modular unit exhaust port 1904.

In some embodiments, the modular unit power port 1902 comprises a jack, an outlet, a cord, a cable, a wireless power transfer unit, or any combination thereof. In some embodiments, the modular unit data port 1901 comprises a jack, an outlet, a cord, a cable, a wired data interface, a Wi-Fi communication device, a Bluetooth communication device, a cellular communication device, or any combination thereof.

In some embodiments, the modular unit 1810 is configured to secure a consumer product. In some embodiments, the consumer product 1820 comprises a food item, a beverage item, an electronics item, a clothing item, or any combination thereof. In some embodiments the modular unit 1810 further comprises a modular unit sensor. In some embodiments, the modular unit sensor comprises a camera, a video camera, a LiDAR, a RADAR, a microphone, a radiation modular unit sensor, a chemical modular unit sensor, a light modular unit sensor, a tactile modular unit sensor, or any combination thereof. In some embodiments, the modular unit sensor is configured to measure a sensed data corresponding to the consumer product 1820. In some embodiments, the modular unit data port 1901 receives data from the modular unit sensor. In some embodiments, the modular unit 1810 further comprises a lock configured to secure the contents therein.

Figure 19A:
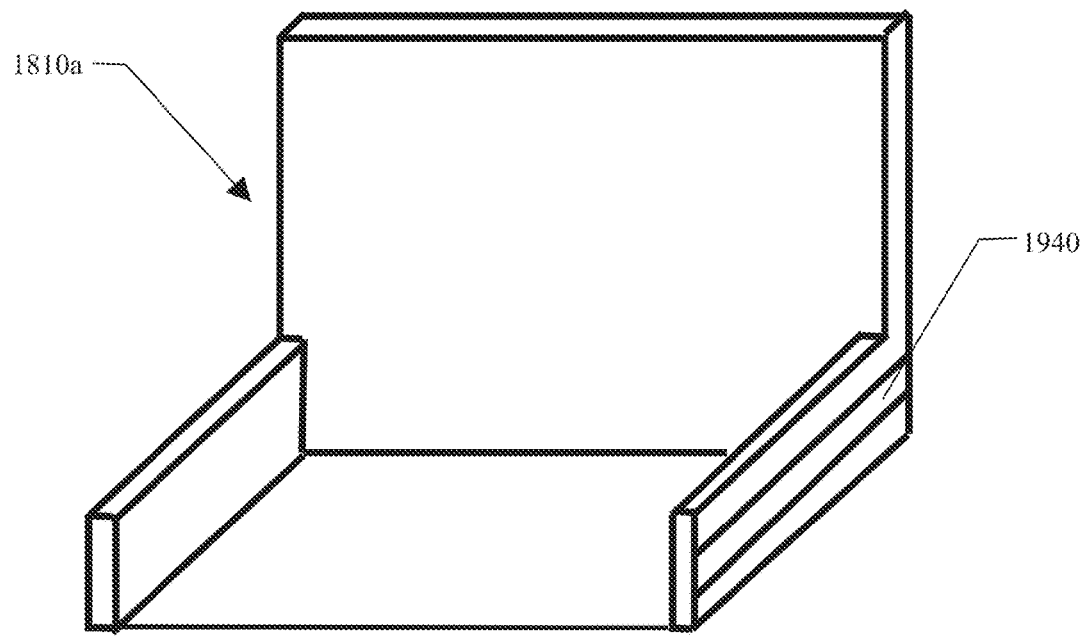
FIG. 19A is a front perspective view of an exemplary first modular unit, in accordance with some embodiments.
Figure 19B:
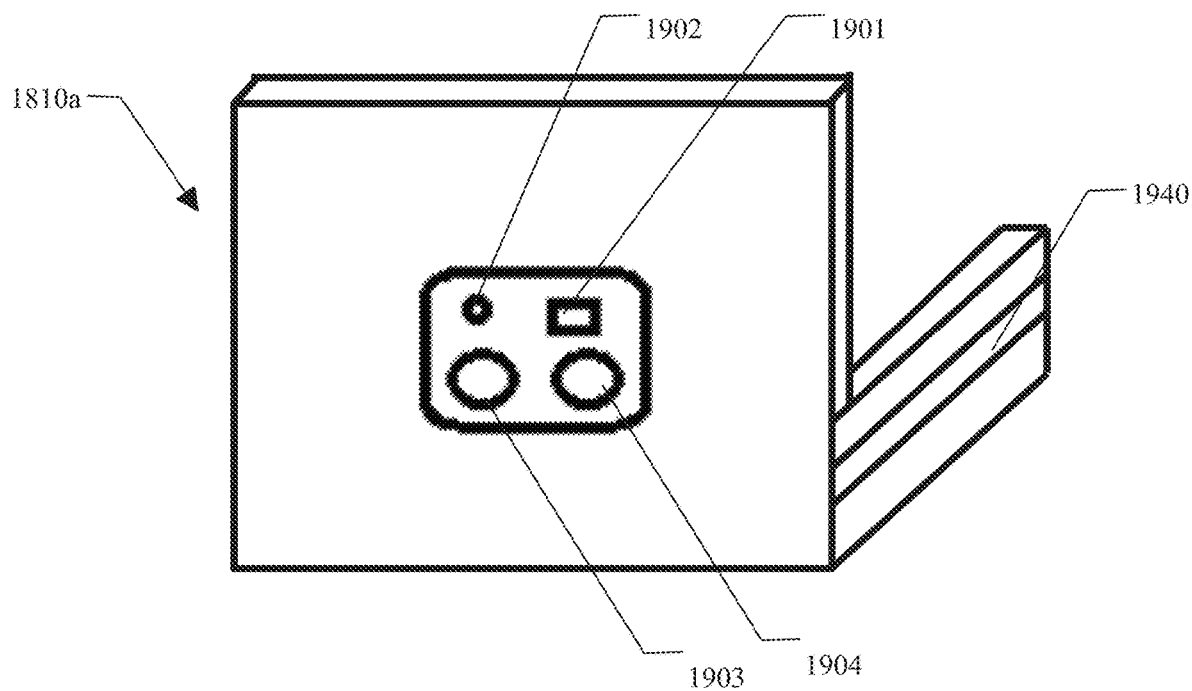
FIG. 19B is a back perspective view of an exemplary first modular unit, in accordance with some embodiments.

FIGS. 19A and 19B show front perspective views of an exemplary first modular unit 1810a comprising a shelf. In some embodiments, the first modular unit 1810a may not comprise at least one of the modular unit power port 1902, the modular unit data port 1901, the modular unit cooling/heating port 1903, and the modular unit exhaust port 1904.

Figure 19C:
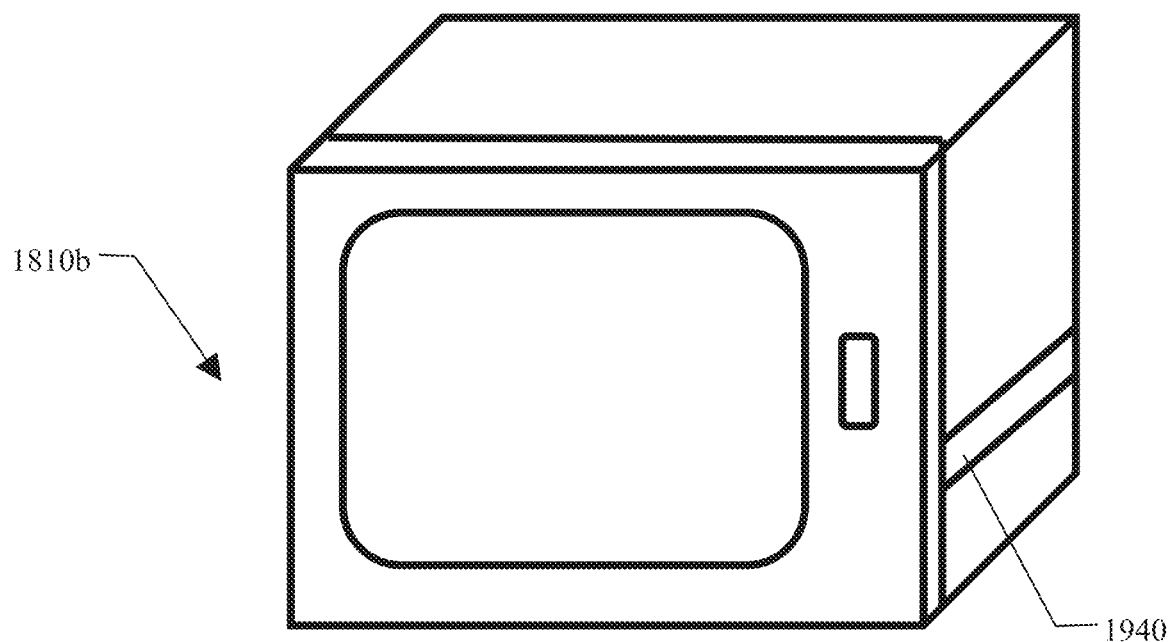
FIG. 19C is a front perspective view of an exemplary second modular unit, in accordance with some embodiments.
Figure 19D:
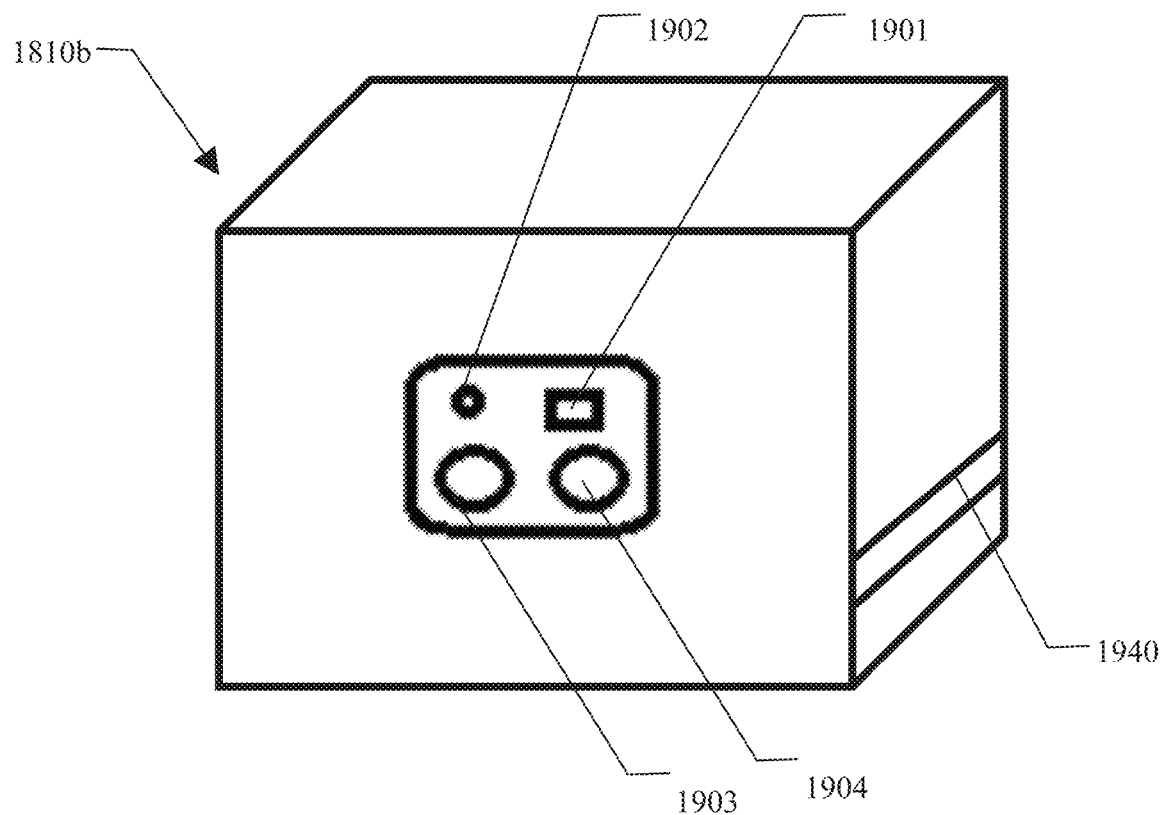
FIG. 19D is a back perspective view of an exemplary second modular unit, in accordance with some embodiments.

FIGS. 19C and 19D show front perspective views of an exemplary second modular unit 1810b comprising a locker modular unit 1810b.

Systems Comprising a Vehicle and a Modular Unit

Provided herein, per FIGS. 17 to 19, is a system comprising an autonomous or semi-autonomous land vehicle 101 and a modular unit 1810.

In some embodiments, per FIG. 17, the vehicle 101 comprises an energy storage device 1760. The energy storage device may comprise a battery, a capacitor, a supercapacitor, or any combination thereof. In some embodiments, the vehicle comprises a communication device 1750, an autonomous or semi-autonomous land propulsion system 130, a vehicle interior fastener 1740, a non-transitory computer-readable storage media, and at least one of: a vehicle power port 1702; vehicle data port 1701; a vehicle cooling/heating port 1703; and a vehicle exhaust port 1704. In some embodiments, the vehicle interior fastener 1740 comprises a hook, a ring, a shelf, a bar, a spring, a rail, a slide, a bolt, a nut, a bearing, a bushing, a tie, a clip, a chain, a rack, a magnet, or any combination thereof. In some embodiments, the vehicle interior fastener 1740 comprises at least one of the vehicle power port 1702, the vehicle data port 1701, the vehicle cooling/heating port 1703, and the vehicle exhaust port 1704. In some embodiments, the vehicle further comprises a plurality of vehicle interior fasteners 1740, the plurality of vehicle interior fasteners 1740 comprising a first vehicle interior fastener configured to reversibly affix a first type of modular unit and a second vehicle interior fastener configured to reversibly affix a second type of modular unit.

In some embodiments, the non-transitory media is encoded with a computer program including instructions executable by a processor to create an application comprising a navigation module and a transmission module. In some embodiments, the navigation module receives at least a location via the communication device 1750 and directing the autonomous or semi-autonomous land propulsion system 130 based at least on the location. In some embodiments, the transmission module transmits an output data, receiving an input data, or both, via the communication device 1750, to a command center. In some embodiments, the input data comprises a modular unit temperature target, a modular unit display data, a modular unit indicator data, a modular unit access data, or any combination thereof. In some embodiments, the output data comprises a presence of a consumer product 1820 secured by the modular unit, a modular unit access status, a current modular unit temperature, a modular unit stock, a modular unit type, or any combination thereof.

In some embodiments, the communication device 1750 comprises a Wi-Fi communication device, a Bluetooth communication device, a cellular communication device, a satellite communication device, or any combination thereof. In some embodiments, the vehicle data port 1701 comprises a wired data interface, a Wi-Fi communication device, a Bluetooth communication device, a cellular communication device, or any combination thereof.

In some embodiments the vehicle 101 further comprises a sensor 1730. In some embodiments, the sensor 1730 comprises a camera, a video camera, a LiDAR, a RADAR, a microphone, a radiation sensor, a chemical sensor, a light sensor, a tactile sensor, or any combination thereof. In some embodiments, the sensor 1730 is configured to measure a sensed data corresponding to the modular unit. In some embodiments, the vehicle data port 1701 receives data from the sensor 1730.

In some embodiments, per FIG. 18, the vehicle 101 is configured to receive two or more modular units 1810. In some embodiments, the vehicle is configured to receive 3 to 25 modular units 1810. In some embodiments, per FIG. 18, the modular unit 1810a 1810b is configured to secure a consumer product. In some embodiments, the consumer product comprises a food item, a beverage item, an electronics item, a clothing item, or any combination thereof. In some embodiments, the vehicle comprises an interior compartment, and wherein the vehicle interior fastener 1740 is configured to reversibly affix the modular unit 1810 within the interior compartment. In some embodiments, the vehicle interior fastener 1740 is configured to reversibly affix the modular unit 1810a 1810b to the vehicle 101. In some embodiments, the vehicle 101 further comprises a lock configured to prevent unauthorized removal of the modular unit 1810a 1810b from the vehicle 101. In some embodiments, the vehicle interior fastener 1740 comprises the lock. In some embodiments, the vehicle 101 further comprises a permanently fixed modular unit 1810. The permanently fixed modular unit 1810 may comprise a shelf, a display, an input device, or any combination thereof.

The vehicle power port 1702 may be configured to transmit power from the energy storage device 1760 to the modular unit 1810. The vehicle data port 1701 may communicatively connect the modular unit 1810 and the transmission module. The vehicle cooling/heating port 1703 may be configured to heat the modular unit 1810, cool the modular unit 1810, or both. The vehicle cooling/heating port 1703 may be alternatively or further configured change the condition of air within the modular unit 1810 in temperature of any degree and in any direction. In some embodiments, vehicle cooling/heating port 1703 may also be configured to alter a humidity or any other quality of the air within the modular unit 1810. In some embodiments, the vehicle 101 further comprises a temperature control system configured to provide heat the modular unit 1810, cool the modular unit 1810, or both. In some embodiments, the vehicle 101 further comprises a humidifier configured to alter an air quality within the modular unit 1810. The vehicle exhaust port 1704 may be configured to receive an exhaust from the modular unit. In some embodiments, the vehicle 101 comprises two or more of the vehicle interior fasteners 1740, the non-transitory computer-readable storage media, and at least one of: the vehicle power port 1702, vehicle data port 1701, the vehicle cooling/heating port 1703, or the vehicle exhaust port 1704.

The modular unit 1810 may be configured to be removably disposed within an autonomous or semi-autonomous land vehicle 101 and may comprise: a modular unit fastener 1940 and at least one of: a modular unit power port 1902; a modular unit data port 1901; a modular unit cooling/heating port 1903; and a modular unit exhaust port 1904. In some embodiments, the modular unit fastener 1940 comprises a hook, a ring, a shelf, a bar, a spring, a rail, a slide, a bolt, a nut, a bearing, a bushing, a tie, a clip, a chain, a rack, a magnet, or any combination thereof.

In referring to FIGS. 19A-19D, the modular unit power port 1902 may be configured to receive power from the vehicle 101. The modular unit data port 1901 may be configured to receive an input data from the vehicle 101, transmit an output data to the vehicle 101, or both. The modular unit cooling/heating port 1903 may be configured to receive heat from the vehicle 101, receive cooling from the vehicle 101, or both. The modular unit exhaust port 1904 may be configured to emit an exhaust to the vehicle 101.

In some embodiments, the vehicle power port 1702 is configured to connect to the modular unit power port 1902. In some embodiments, the vehicle data port 1701 is configured to connect to the modular unit cooling/heating port 1903. In some embodiments, the vehicle cooling/heating port 1703 is configured to connect to the modular unit data port 1901. In some embodiments, the vehicle exhaust port 1704 is configured to connect to the modular unit exhaust port 1904.

In some embodiments, the vehicle power port 1702 and the modular unit power port 1902 are configured to transfer power from the vehicle 101 to a display, an indicator, a light, a speaker, a temperature control system, a heater, or any combination thereof within the modular unit 1810. In some embodiments, the vehicle data port 1701 and the modular unit data port 1901 are configured to transfer data from the vehicle 101 to a display, an indicator, a light, a speaker, a sensor, a thermometer, or any combination thereof within the modular unit 1810. In some embodiments, the vehicle cooling/heating port 1703 and the modular unit cooling/heating port 1903 are configured to transfer heat or cold from the vehicle 101 to maintain a set temperature within the modular unit 1810. In some embodiments, the vehicle air exhaust port 1704 and the modular unit exhaust port 1904 are configured to transfer exhaust from the modular unit 1810 emitted by any component within the modular unit 1810. In one example, the vehicle air exhaust port 1704 and the modular unit exhaust port 1904 are configured to transfer gaseous exhaust comprising an odor to the vehicle 101 to prevent cross-contamination of smells or vapors between objects within the modular unit 1810, or between the one or more modular units 1810.

In some embodiments, the vehicle power port 1702 and the modular unit power port 1902 comprise a plug, a socket, a connector, a wire, a cable, a wireless power connector, or any combination thereof. In some embodiments, the vehicle data port 1701 and the modular unit data port 1901 comprise a plug, a socket, a connector, a wire, a cable, a wireless connector, a Bluetooth connector, or any combination thereof. In some embodiments, vehicle cooling/heating port 1703 and the modular unit cooling/heating port 1903 comprise a push to connect connector, a quick connector, a jack, a fitting, a duct, or any combination thereof. In some embodiments, the vehicle air exhaust port 1704 and the modular unit exhaust port 1904 comprise a push to connect connector, a quick connector, a jack, a fitting, a duct, or any combination thereof.

The modular unit fastener 1940 may be configured to reversibly attach to the vehicle 101. In some embodiments, the modular unit fastener 1940 comprises at least one of the modular unit power port 1902, the modular unit data port 1901, the modular unit cooling/heating port 1903, and the modular unit exhaust port 1904.

In some embodiments, the modular unit power port 1902 comprises a jack, an outlet, a cord, a cable, a wireless power transfer unit, or any combination thereof. In some embodiments, the modular unit data port 1901 comprises a jack, an outlet, a cord, a cable, a wired data interface, a Wi-Fi communication device, a Bluetooth communication device, a cellular communication device, or any combination thereof.

In some embodiments, the modular unit 1810 is configured to secure a consumer product 1820. In some embodiments, the consumer product 1820 comprises a food item, a beverage item, an electronics item, a clothing item, or any combination thereof. In some embodiments the modular unit 1810 further comprises a modular unit sensor. In some embodiments, the modular unit sensor comprises a camera, a video camera, a LiDAR, a RADAR, a microphone, a radiation modular unit sensor, a chemical modular unit sensor, a light modular unit sensor, a tactile modular unit sensor, or any combination thereof. In some embodiments, the modular unit sensor is configured to measure a sensed data corresponding to the consumer product 1820. In some embodiments, the modular unit data port 1901 receives data from the modular unit sensor.

Operating Environments

The autonomous vehicles in the fleet may be configured to operate within a variety of unstructured open operating environments to enable service to a broad range of locations. In some embodiments, the unstructured open environment is a non-confined geographic region accessible by navigable pathways comprising: public roads; private roads; bike paths; open fields, open public lands, open private lands, pedestrian walkways, lakes, rivers, or streams. In some embodiments, the closed environment is a confined, enclosed, or semi-enclosed structure accessible by navigable pathways comprising: open areas or rooms within commercial architecture, with or without structures or obstacles therein; airspace within open areas or rooms within commercial architecture, with or without structures or obstacles therein; public or dedicated aisles; hallways; tunnels; ramps; elevators; conveyors; or pedestrian walkways. In some embodiments, the unstructured open environment is a non-confined airspace or even near-space environment which includes all main layers of the Earth's atmosphere comprising the troposphere, the stratosphere, the mesosphere, the thermosphere and the exosphere. In some embodiments, the navigation module controls routing of the conveyance system of the vehicles in the fleet in the unstructured open or closed environments.

Goods and Services

In some embodiments, the user comprises a fleet manager, a sub-contracting vendor, a service provider, a customer, a business entity, an individual, or a third party. In some embodiments, the services comprises a subscription service, a prescription service, a marketing service, an advertising service, a notification service, a requested service, an ordered service, a scheduled delivery service, or any combination thereof. For example, the scheduled delivery services may include special repeat deliveries such as groceries, prescriptions, drinks, mail, documents, or any combination thereof.

In some embodiments, the services alternatively or further comprise a return of a good (e.g., a signed document), receiving one set of goods and returning a different set of goods (e.g., product replacement/returns, groceries, merchandise, books, recording, videos, movies, payment transactions, etc.), or a third party user providing instruction and or authorization to a goods or service provider to prepare, transport, deliver and/or retrieve goods to a principle user in a different location. In some embodiments, the services further or alternatively comprise: advertising services, land survey services, patrol services, monitoring services, traffic survey services, signage and signal survey services, architectural building, or road infrastructure survey services.

In some embodiments, the service further or alternatively comprises processing or manufacturing a good. In some embodiments, the autonomous vehicle is configured to process or manufacture the good in-transit. In some embodiments, the processed or manufactured good comprises: a beverage with or without condiments (such as coffee, tea, carbonated drinks, etc.), a fast food, a microwavable food, a reheatable food, or a rehydratable food. In some embodiments, the service comprises a financial transaction. In some embodiments, the service comprises advertising, marketing, public safety, public service, or any combination thereof.

Digital Processing Device

In some embodiments, the platforms, systems, media, and methods described herein include a digital processing device, or use of the same. In further embodiments, the digital processing device includes one or more hardware central processing units (CPUs) or general purpose graphics processing units (GPGPUs) that carry out the device's functions. In still further embodiments, the digital processing device further comprises an operating system configured to perform executable instructions. In some embodiments, the digital processing device is optionally connected a computer network. In further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device.

In accordance with the description herein, suitable digital processing devices include, by way of non-limiting examples, server computers, desktop computers, laptop computers, notebook computers, sub-notebook computers, netbook computers, netpad computers, set-top computers, and media streaming devices, handheld computers, Internet appliances, mobile smartphones, tablet computers, personal digital assistants, video game consoles, and vehicles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®. Those of skill in the art will also recognize that suitable media streaming device operating systems include, by way of non-limiting examples, Apple TV®, Roku®, Boxee®, Google TV®, Google Chromecast®, Amazon Fire®, and Samsung® HomeSync®. Those of skill in the art will also recognize that suitable video game console operating systems include, by way of non-limiting examples, Sony® PS3®, Sony® PS4®, Microsoft® Xbox 360®, Microsoft Xbox One, Nintendo® Wii®, Nintendo® Wii U®, and Ouya®.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

In some embodiments, the digital processing device includes a display to send visual information to a user. In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In other embodiments, the display is a video projector. In yet other embodiments, the display is a head-mounted display in communication with the digital processing device, such as a VR headset. In further embodiments, suitable VR headsets include, by way of non-limiting examples, HTC Vive, Oculus Rift, Samsung Gear VR, Microsoft HoloLens, Razer OSVR, FOVE VR, Zeiss VR One, Avegant Glyph, Freefly VR headset, and the like. In still further embodiments, the display is a combination of devices such as those disclosed herein.

In some embodiments, the digital processing device includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera or other sensor to capture motion or visual input. In further embodiments, the input device is a Kinect, Leap Motion, or the like. In still further embodiments, the input device is a combination of devices such as those disclosed herein.

Figure 14:
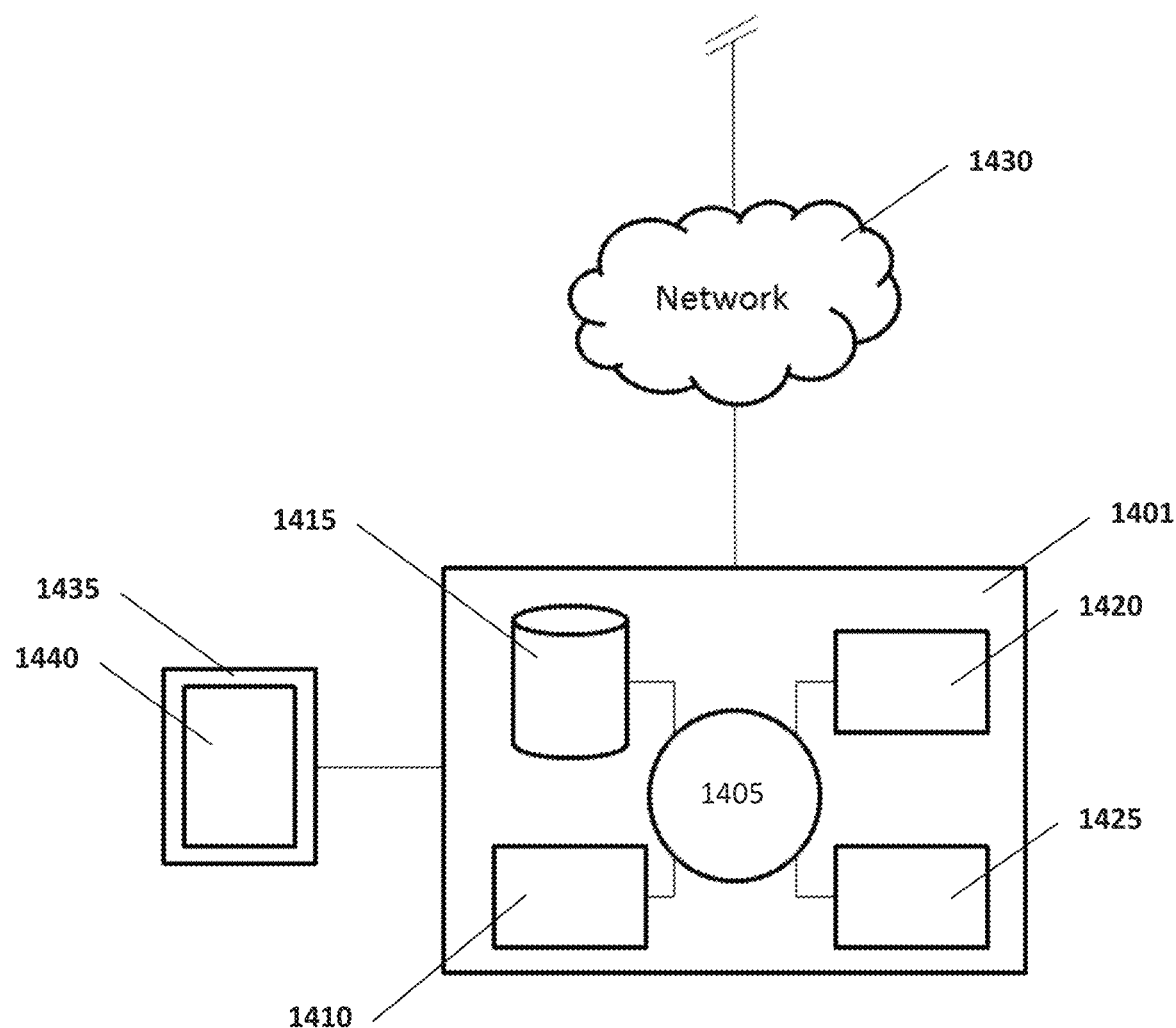
FIG. 14 is a non-limiting schematic diagram of a digital processing device; in this case, a device with one or more CPUs, a memory, a communication interface, and a display, in accordance with some embodiments.

Referring to FIG. 14, in a particular embodiment, a digital processing device 1401 is programmed or otherwise configured to managing autonomous vehicles. The device 1401 is programmed or otherwise configured to manage autonomous vehicles. In this embodiment, the digital processing device 1401 includes a central processing unit (CPU, also "processor" and "computer processor" herein) 1405, which is optionally a single core, a multi core processor, or a plurality of processors for parallel processing. The digital processing device 1401 also includes memory or memory location 1410 (e.g., random-access memory, read-only memory, flash memory), electronic storage unit 1415 (e.g., hard disk), communication interface 1420 (e.g., network adapter) for communicating with one or more other systems, and peripheral devices 1425, such as cache, other memory, data storage and/or electronic display adapters. The memory 1410, storage unit 1415, interface 1420 and peripheral devices 1425 are in communication with the CPU 1405 through a communication bus (solid lines), such as a motherboard. The storage unit 1415 comprises a data storage unit (or data repository) for storing data. The digital processing device 1401 is optionally operatively coupled to a computer network ("network") 1430 with the aid of the communication interface 1420. The network 1430, in various cases, is the internet, an internet, and/or extranet, or an intranet and/or extranet that is in communication with the internet. The network 1430, in some cases, is a telecommunication and/or data network. The network 1430 optionally includes one or more computer servers, which enable distributed computing, such as cloud computing. The network 1430, in some cases, with the aid of the device 1401, implements a peer-to-peer network, which enables devices coupled to the device 1401 to behave as a client or a server.

Continuing to refer to FIG. 14, the CPU 1405 is configured to execute a sequence of machine-readable instructions, embodied in a program, application, and/or software. The instructions are optionally stored in a memory location, such as the memory 1410. The instructions are directed to the CPU 105, which subsequently program or otherwise configure the CPU 1405 to implement methods of the present disclosure. Examples of operations performed by the CPU 1405 include fetch, decode, execute, and write back. The CPU 1405 is, in some cases, part of a circuit, such as an integrated circuit. One or more other components of the device 1401 are optionally included in the circuit. In some cases, the circuit is an application specific integrated circuit (ASIC) or a field programmable gate array (FPGA).

Continuing to refer to FIG. 14, the storage unit 1415 optionally stores files, such as drivers, libraries and saved programs. The storage unit 1415 optionally stores user data, e.g., user preferences and user programs. The digital processing device 1401, in some cases, includes one or more additional data storage units that are external, such as located on a remote server that is in communication through an intranet or the internet.

Continuing to refer to FIG. 14, the digital processing device 1401 optionally communicates with one or more remote computer systems through the network 1430. For instance, the device 1401 optionally communicates with a remote computer system of a user. Examples of remote computer systems include personal computers (e.g., portable PC), slate or tablet PCs (e.g., Apple® iPad, Samsung® Galaxy Tab, etc.), smartphones (e.g., Apple® iPhone, Android-enabled device, Blackberry®, etc.), or personal digital assistants.

Methods as described herein are optionally implemented by way of machine (e.g., computer processor) executable code stored on an electronic storage location of the digital processing device 101, such as, for example, on the memory 1410 or electronic storage unit 1415. The machine executable or machine readable code is optionally provided in the form of software. During use, the code is executed by the processor 1405. In some cases, the code is retrieved from the storage unit 1415 and stored on the memory 1410 for ready access by the processor 1405. In some situations, the electronic storage unit 1415 is precluded, and machine-executable instructions are stored on the memory 1410.

Non-Transitory Computer Readable Storage Medium

In some embodiments, the platforms, systems, media, and methods disclosed herein include one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

In some embodiments, the platforms, systems, media, and methods disclosed herein include at least one computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft®.NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® ActionScript, JavaScript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Figure 15:
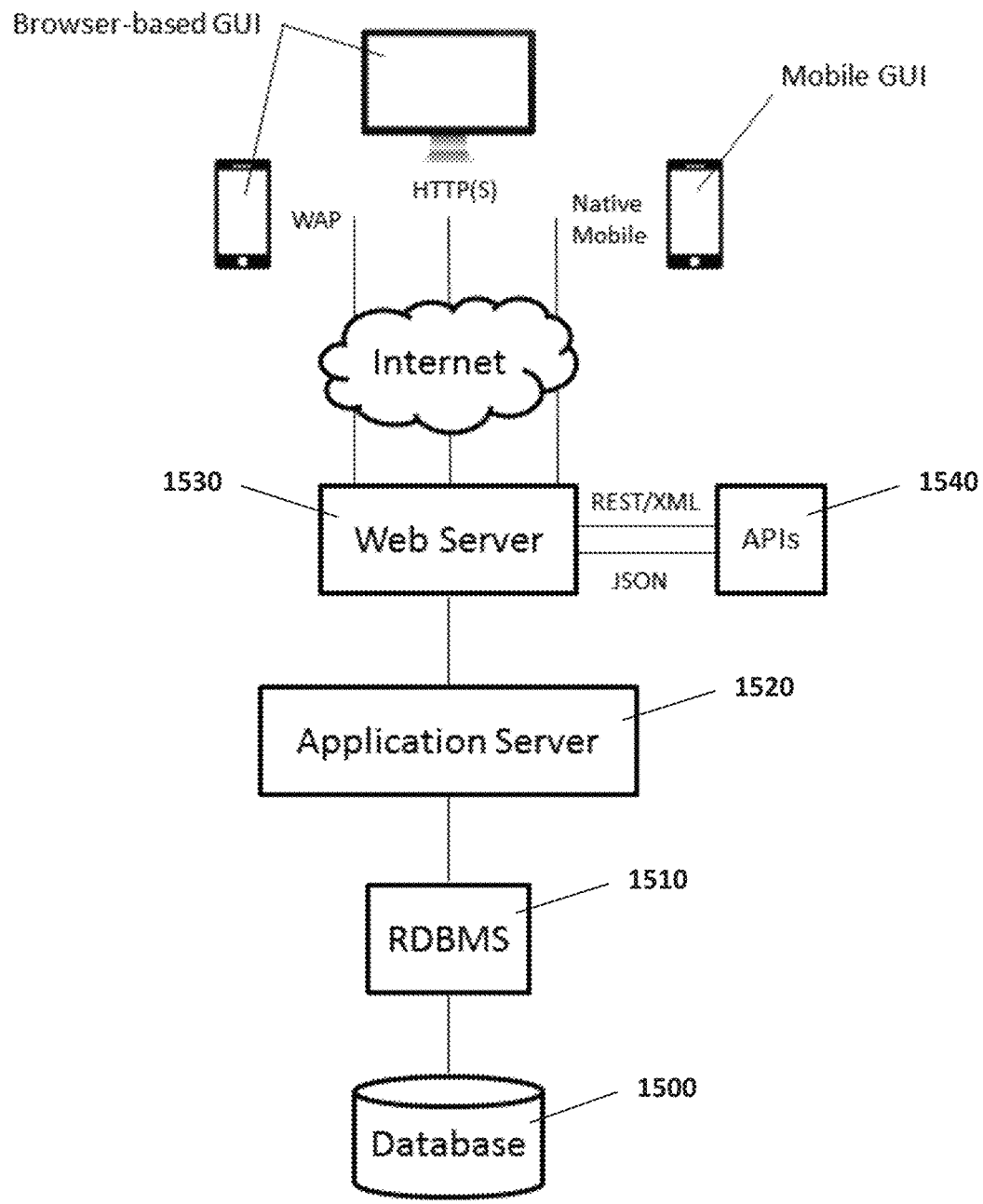
FIG. 15 is a non-limiting schematic diagram of a web/mobile application provision system; in this case, a system providing browser-based and/or native mobile user interfaces, in accordance with some embodiments.

Referring to FIG. 15, in a particular embodiment, an application provision system comprises one or more databases 1500 accessed by a relational database management system (RDBMS) 1510. Suitable RDBMSs include Firebird, MySQL, PostgreSQL, SQLite, Oracle Database, Microsoft SQL Server, IBM DB2, IBM Informix, SAP Sybase, SAP Sybase, Teradata, and the like. In this embodiment, the application provision system further comprises one or more application severs 1520 (such as Java servers, .NET servers, PHP servers, and the like) and one or more web servers 1530 (such as Apache, IIS, GWS and the like). The web server(s) optionally expose one or more web services via app application programming interfaces (APIs) 1540. Via a network, such as the internet, the system provides browser-based and/or mobile native user interfaces.

Figure 16:
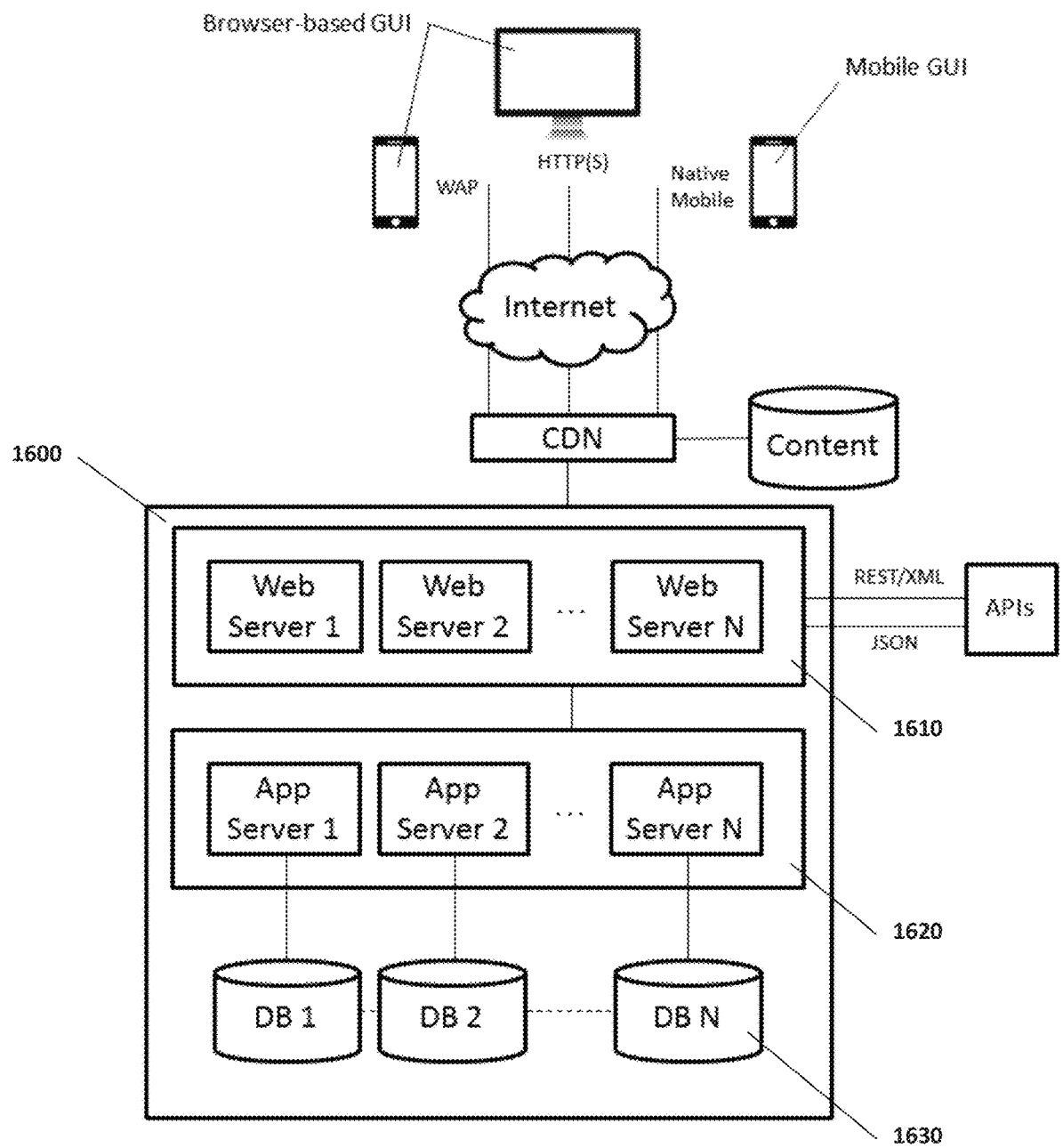
FIG. 16 is a non-limiting schematic diagram of a cloud-based web/mobile application provision system; in this case, a system comprising an elastically load balanced, auto-scaling web server and application server resources as well synchronously replicated databases, in accordance with some embodiments.

Referring to FIG. 16, in a particular embodiment, an application provision system alternatively has a distributed, cloud-based architecture 1600 and comprises elastically load balanced, auto-scaling web server resources 1610, and application server resources 1620 as well synchronously replicated databases 1630.

Mobile Application

In some embodiments, a computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Google® Play, Chrome WebStore, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB.NET, or combinations thereof. Compilation is often performed, at least in part, to create an executable program. In some embodiments, a computer program includes one or more executable complied applications.

Web Browser Plug-in

In some embodiments, the computer program includes a web browser plug-in (e.g., extension, etc.). In computing, a plug-in is one or more software components that add specific functionality to a larger software application. Makers of software applications support plug-ins to enable third-party developers to create abilities which extend an application, to support easily adding new features, and to reduce the size of an application. When supported, plug-ins enable customizing the functionality of a software application. For example, plug-ins are commonly used in web browsers to play video, generate interactivity, scan for viruses, and display particular file types. Those of skill in the art will be familiar with several web browser plug-ins including, Adobe® Flash® Player, Microsoft® Silverlight®, and Apple® QuickTime®.

In view of the disclosure provided herein, those of skill in the art will recognize that several plug-in frameworks are available that enable development of plug-ins in various programming languages, including, by way of non-limiting examples, C++, Delphi, Java™, PHP, Python™, and VB.NET, or combinations thereof.

Web browsers (also called Internet browsers) are software applications, designed for use with network-connected digital processing devices, for retrieving, presenting, and traversing information resources on the World Wide Web. Suitable web browsers include, by way of non-limiting examples, Microsoft® Internet Explorer®, Mozilla® Firefox®, Google® Chrome, Apple® Safari®, Opera Software® Opera®, and KDE Konqueror. In some embodiments, the web browser is a mobile web browser. Mobile web browsers (also called microbrowsers, mini-browsers, and wireless browsers) are designed for use on mobile digital processing devices including, by way of non-limiting examples, handheld computers, tablet computers, netbook computers, subnotebook computers, smartphones, music players, personal digital assistants (PDAs), and handheld video game systems. Suitable mobile web browsers include, by way of non-limiting examples, Google® Android® browser, RIM BlackBerry® Browser, Apple® Safari®, Palm® Blazer, Palm® WebOS® Browser, Mozilla® Firefox® for mobile, Microsoft® Internet Explorer® Mobile, Amazon® Kindle® Basic Web, Nokia® Browser, Opera Software® Opera® Mobile, and Sony® PSP™ browser.

Software Modules

In some embodiments, the platforms, systems, media, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Databases

In some embodiments, the platforms, systems, media, and methods disclosed herein include one or more databases, or use of the same. In view of the disclosure provided herein, those of skill in the art will recognize that many databases are suitable for autonomous vehicles. In various embodiments, suitable databases include, by way of non-limiting examples, relational databases, non-relational databases, object oriented databases, object databases, entity-relationship model databases, associative databases, and XML databases. Further non-limiting examples include SQL, PostgreSQL, MySQL, Oracle, DB2, and Sybase. In some embodiments, a database is internet-based. In further embodiments, a database is web-based. In still further embodiments, a database is cloud computing-based. In other embodiments, a database is based on one or more local computer storage devices.

Terms and Definitions

As used herein, the phrases "at least one," "one or more," and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

As used herein, the terms "fleet," "sub-fleet," and like terms are used to indicate a number of land vehicles, watercraft, or aircraft operating together or under the same ownership. In some embodiments the fleet or sub-fleet is engaged in the same activity. In some embodiments, the fleet or sub-fleet are engaged in similar activities. In some embodiments, the fleet, or sub-fleet are engaged in different activities.

As used herein, the terms "autonomous vehicle," "vehicle fleet," "vehicle," "all-terrain vehicle," and like terms are used to indicate a mobile machine that transports cargo. Typical vehicles include cars, wagons, vans, unmanned motor vehicles (e.g., tricycles, trucks, trailers, buses, etc.), unmanned railed vehicles (e.g., trains, trams, etc.), unmanned watercraft (e.g., ships, boats, ferries, landing craft, barges, rafts, etc.), aerial drones, unmanned hovercraft (air, land and water types), unmanned aircraft, and even including unmanned spacecraft.

As used herein, the terms "user," "operator," "fleet operator," and like terms are used to indicate the entity that owns or is responsible for managing and operating the vehicle fleet.

As used herein, the term "customer" and like terms are used to indicate the entity that requests the services provided the vehicle fleet.

As used herein, the terms "provider," "business," "vendor," "third party vendor," and like terms are used to indicate an entity that works in concert with the fleet owner or operator to utilize the services of the vehicle fleet to deliver the provider's product from and or return the provider's product to the provider's place of business or staging location.

As used herein, the terms "server," "computer server," "central server," "main server," and like terms are used to indicate a computer or device on a network that manages the fleet resources, namely the autonomous vehicles.

As used herein, the term "controller" and like terms are used to indicate a device that controls the transfer of data from a computer to a peripheral device and vice versa. For example, disk drives, display screens, keyboards, and printers all require controllers. In personal computers, the controllers are often single chips. As used herein the controller is commonly used for managing access to components of the autonomous vehicle such as the securable compartments.

As used herein a "mesh network" is a network topology in which each node relays data for the network. All mesh nodes cooperate in the distribution of data in the network. It may be applied to both wired and wireless networks. Wireless mesh networks may be considered a type of "Wireless ad hoc" network. Thus, wireless mesh networks are closely related to Mobile ad hoc networks (MANETs). Although MANETs are not restricted to a specific mesh network topology, Wireless ad hoc networks or MANETs may take any form of network topology. Mesh networks may relay messages using either a flooding technique or a routing technique. With routing, the message is propagated along a path by hopping from node to node until it reaches its destination. To ensure that all its paths are available, the network must allow for continuous connections and must reconfigure itself around broken paths, using self-healing algorithms such as Shortest Path Bridging. Self-healing allows a routing-based network to operate when a node breaks down or when a connection becomes unreliable. As a result, the network is typically quite reliable, as there is often more than one path between a source and a destination in the network. This concept may also apply to wired networks and to software interaction. A mesh network whose nodes are all connected to each other is a fully connected network.

As used herein, the term "module" and like terms are used to indicate a self-contained hardware component of the central server, which in turn comprises software modules. In software, a module is a part of a program. Programs are composed of one or more independently developed modules that are not combined until the program is linked. A single module may contain one or several routines, or sections of programs that perform a particular task. As used herein the fleet management module comprises software modules for managing various aspects and functions of the vehicle fleet.

As used herein, the terms "processor," "digital processing device," and like terms are used to indicate a microprocessor or central processing unit (CPU). The CPU is the electronic circuitry within a computer that carries out the instructions of a computer program by performing the basic arithmetic, logical, control and input/output (I/O) operations specified by the instructions.

In accordance with the description herein, suitable digital processing devices include, by way of non-limiting examples, server computers, desktop computers, laptop computers, notebook computers, sub-notebook computers, netbook computers, netpad computers, set-top computers, handheld computers, Internet appliances, mobile smartphones, tablet computers, personal digital assistants, video game consoles, and vehicles. Those of skill in the art will recognize that many smartphones are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

In some embodiments, the device includes a storage and/or memory device. The storage and/or memory device is one or more physical apparatus used to store data or programs on a temporary or permanent basis. In some embodiments, the device is volatile memory and requires power to maintain stored information. In some embodiments, the device is non-volatile memory and retains stored information when the digital processing device is not powered. In some embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In some embodiments, the device is a storage device including, by way of non-limiting examples, CD-ROMs, DVDs, flash memory devices, magnetic disk drives, magnetic tapes drives, optical disk drives, and cloud computing based storage. In some embodiments, the storage and/or memory device is a combination of devices such as those disclosed herein.

In some embodiments, the digital processing device includes a display to send visual information to a user. In some embodiments, the display is a cathode ray tube (CRT). In some embodiments, the display is a liquid crystal display (LCD). In some embodiments, the display is a thin film transistor liquid crystal display (TFT-LCD). In some embodiments, the display is an organic light emitting diode (OLED) display. In various some embodiments, on OLED display is a passive-matrix OLED (PMOLED) or active-matrix OLED (AMOLED) display. In some embodiments, the display is a plasma display. In some embodiments, the display is a video projector. In some embodiments, the display is interactive (e.g., having a touch screen or a sensor such as a camera, a 3D sensor, a LiDAR, a radar, etc.) that may detect user interactions/gestures/responses and the like. In still some embodiments, the display is a combination of devices such as those disclosed herein.

What is claimed is:

1. A reconfigurable autonomous or semi-autonomous vehicle system comprising:
   a) a plurality of first removable modular units, wherein at least one of the plurality of first modular units comprises a first width, a first height, and a first depth, wherein each first modular unit further comprises a first modular unit fastener, a first modular unit power port, and a first modular unit data port;
   b) a second removable modular unit, the second modular unit comprising a second width, a second height, and a second depth, wherein the second modular unit further comprises a second modular unit fastener, a second modular unit power port, a second modular unit data port, and wherein the second removable modular unit is characterized by at least one of:
      (i) the second width different from the first width,
      (ii) the second height different from the first height, and
      (iii) the second depth different from the first depth;
   c) an autonomous or semi-autonomous land vehicle comprising:
      (i) an energy storage device,
      (ii) a communication device,
      (iii) an autonomous or semi-autonomous propulsion system,
      (iv) a non-transitory computer-readable storage media encoded with a computer program including instructions executable by a processor to create an application comprising:
         A) a navigation module receiving at least a location via the communication device and directing the autonomous or semi-autonomous land propulsion system based at least on the location, and
         B) a transmission module transmitting an output data, receiving an input data, or both, via the communication device, to a command center, and
      (v) a modular unit receptacle, the receptacle configured to receive one or more modular units, the one or more modular units including at least one of the first removable modular unit and alternatively receive the second removable modular unit, the receptacle comprising:
         A) a plurality of vehicle power ports configured to transmit power from the energy storage device to the one or more modular units,
         B) a plurality of vehicle data ports configured to communicatively connect to the one or more modular units, and
         C) at least one vehicle fastener configured to reversibly affix the one or more modular units to the vehicle,
      wherein the system further comprises a multi-modal autonomous or semi-autonomous modular configuration comprising a first configuration mode and a second configuration mode;
      wherein the first configuration mode comprises the receptacle receiving the plurality of first modular units, the plurality of first modular unit power ports operably coupling to the plurality of vehicle power ports to receive a first power from the energy storage device, the plurality of vehicle data ports communicatively connecting the transmission module to the plurality of first modular unit data ports, and the at least one vehicle fastener operably coupling with the first modular unit fasteners to reversibly affix the plurality of first modular units to the vehicle, and
   wherein the second configuration mode comprises the receptacle receiving the second modular unit, the second modular unit power port operably coupling to one of the plurality of vehicle power ports to receive a second power from the energy storage device, at least one vehicle data port communicatively connecting the transmission module to the second modular unit data port, and the at least one vehicle fastener operably coupling with the second modular unit fastener to reversibly affix the second modular unit to the vehicle;
      wherein the at least one of the plurality of first modular units comprises a first modular unit exhaust port;
      wherein the receptacle further comprises a plurality of vehicle exhaust ports configured to receive exhaust from one or more modular units; and
      wherein the first configuration mode comprises at least one of the plurality of vehicle exhaust ports operably coupling to the at least one of the first modular unit exhaust port to receive a first exhaust from the at least one of the first modular unit, the first exhaust being gaseous exhaust emitted by a component within the at least one of the first modular unit.

2. The system of claim 1, wherein the vehicle interior fastener comprises a hook, a ring, a shelf, a bar, a spring, a rail, a slide, a bolt, a nut, a bearing, a bushing, a tie, a clip, a chain, a rack, a magnet, or any combination thereof.

3. The system of claim 1, wherein the vehicle further comprises a lock configured to prevent unauthorized removal of any modular unit from the vehicle, wherein the lock includes the at least one vehicle fastener and a modular unit fastener included in the one or more modular units.

4. The system of claim 1, wherein at least one of the plurality of first removable modular units or the second removable modular unit include a display screen, and wherein the input data comprises a modular unit display data.

5. The system of claim 1, wherein the output data comprises a modular unit access status, a current modular unit temperature, a modular unit type, or any combination thereof.

6. The system of claim 1 further including a vehicle temperature control system configured to control temperature within the one or more modular units, the vehicle temperature control system being disposed away from the vehicle.

7. A reconfigurable autonomous vehicle system comprising:
  a) a first removable modular unit, wherein the first removable modular unit comprises a first width, a first height, and a first depth, wherein the first removable modular unit further comprises a first modular unit fastener, a first modular unit power port, and a first modular unit data port;
  b) a second removable modular unit, the second removable modular unit comprising a second width, a second height, and a second depth, wherein the second removable modular unit further comprises a second modular unit fastener, a second modular unit power port, and a second modular unit data port; and
  c) an autonomous vehicle comprising
    (i) an energy storage device,
    (ii) a communication device,
    (iii) a propulsion system, the propulsion system arranged to provide autonomous propulsion,
    (iv) a non-transitory computer-readable storage media encoded with a computer program including instructions executable by a processor to create an application comprising
      A) a navigation module receiving at least a location via the communication device and directing the propulsion system based at least on the location, and
      B) a transmission module transmitting an output data to a command center, receiving an input data from the command center, or both, via the communication device, and
    (v) a plurality of interior compartments, the plurality of interior compartments including a first interior compartment and a second interior compartment, the first interior compartment configured to receive one or more modular units such that the one or modular units is removably disposed within the first interior compartment, the one or more modular units including at least one of the first removable modular unit and the second removable modular unit, the first interior compartment comprising
      A) at least one vehicle power port configured to transmit power from the energy storage device to the one or more modular units,
      B) at least one vehicle data port configured to communicatively connect to the one or more modular units,
      C) at least one vehicle fastener configured to reversibly attach the one or more modular units to the vehicle, and
      D) at least one cooling/heating port configured to transfer heat or cold from the autonomous vehicle and at least one exhaust port configured to transfer a gaseous exhaust from the one or more modular units.

8. The reconfigurable autonomous vehicle system of claim 7 further including a vehicle temperature control system configured to control temperature within at least one of the first interior compartment and the second interior compartment.

9. The reconfigurable autonomous vehicle system of claim 7 further including a vehicle temperature control system configured to control temperature within the first removable modular unit and the second removable modular unit.

10. A reconfigurable autonomous or semi-autonomous vehicle system comprising:
  a) a first removable modular unit, wherein the first removable modular unit comprises a first width, a first height, and a first depth, wherein the first modular unit further comprises a first modular unit fastener, the first modular unit being of a first type;
  b) a second removable modular unit, the second removable modular unit comprising a second width, a second height, and a second depth, wherein the second removable modular unit further comprises a second modular unit fastener, the second modular unit being of a second type, the second type being different from the first type; and
  c) an autonomous or semi-autonomous land vehicle comprising
    (i) an energy storage device,
    (ii) a communication device,
    (iii) an autonomous or semi-autonomous propulsion system,
    (iv) a non-transitory computer-readable storage media encoded with a computer program including instructions executable by a processor to create an application comprising
      A) a navigation module receiving at least a location via the communication device and directing the autonomous or semi-autonomous land propulsion system based at least on the location, and
      B) a transmission module transmitting an output data to a command center, receiving an input data from the command center, or both, via the communication device, and
    (v) a modular unit receptacle, the receptacle configured to receive one or more modular units, the one or more modular units including at least one of the first removable modular unit and the second removable modular unit, the receptacle comprising a plurality of vehicle fasteners including a first vehicle fastener configured to reversibly affix the first removable modular unit to the vehicle and a second vehicle fastener configured to reversibly affix the second removable modular unit to the vehicle, wherein the first modular unit fastener includes at least one of a first modular unit cooling or heating port, and a modular unit exhaust port.

11. An autonomous vehicle system comprising:
  a) a first removable modular unit, wherein the first removable modular unit includes a first modular unit fastener, a first modular unit power port, and a first modular unit data port;
  b) a second removable modular unit, wherein the second removable modular unit includes a second modular unit fastener, a second modular unit power port, and a second modular unit data port; and
  c) an autonomous vehicle comprising
    (ii) an energy storage device,
    (ii) a communication device,
    (iii) a propulsion system, the propulsion system arranged to provide autonomous propulsion,
    (iv) a non-transitory computer-readable storage media encoded with a computer program including instructions executable by a processor to create an application comprising A) a navigation module receiving at least a location via the communication device and directing the propulsion system based at least on the location, and B) a transmission module transmitting an output data to a command center, receiving an input data from the command center, or both, via the communication device, and (v) at least a first interior compartment, the first interior compartment configured to receive one or more modular units such that the one or modular units is removably disposed within the first interior compartment, the one or more modular units including at least one of the first removable modular unit and the second removable modular unit, the first interior compartment including at least one vehicle power port configured to transmit power from the energy storage device to the one or more modular units and at least one vehicle data port configured to communicatively connect to the one or more modular units, wherein the first interior compartment is configured to transfer heat or cold from the autonomous vehicle and to transfer a gaseous exhaust from the one or more modular units.

* * * * *